United States Patent [19]

Borcherdt et al.

[11] Patent Number: 4,604,699
[45] Date of Patent: Aug. 5, 1986

[54] GENERAL EARTHQUAKE OBSERVATION SYSTEM

[75] Inventors: Roger D. Borcherdt, Mountain View; Jon P. Fletcher; Richard E. Warrick, both of Palo Alto; Gary L. Maxwell, Menlo Park; Edward G. Jensen, Newark; John V. Schaack, Cupertino, all of Calif.

[73] Assignee: The United States of America as represented by the Secretary of the Interior, Washington, D.C.

[21] Appl. No.: 573,775

[22] Filed: Jan. 25, 1984

[51] Int. Cl.⁴ .................... G01V 1/00; G01W 1/10
[52] U.S. Cl. .................... 364/420; 364/421; 364/200; 364/900
[58] Field of Search ........ 364/420, 421, 200 MS File, 364/900 MS File

[56] References Cited

U.S. PATENT DOCUMENTS

| | | | |
|---|---|---|---|
| 3,344,407 | 9/1967 | Koeijmans | 364/900 |
| 3,504,164 | 3/1970 | Farell et al. | 364/900 |
| 3,514,759 | 5/1970 | Watanabe et al. | 364/900 |
| 4,193,393 | 3/1980 | Schlager | 128/706 X |
| 4,258,421 | 3/1981 | Juhasz | 364/424 |
| 4,307,455 | 12/1981 | Juhasz | 364/900 |
| 4,380,059 | 4/1983 | Ruehle | 364/421 X |

Primary Examiner—Jerry Smith
Assistant Examiner—Charles B. Meyer
Attorney, Agent, or Firm—Thomas Zack

[57] ABSTRACT

A computerized, automatic, portable general earthquake observation system is disclosed. The system includes a microprocessor and associated computer program stored in program memory, which control other components of the system through a computer bus. Input channels for receiving signals from sensors are connected to a signal conditioning module which is selectively coupled to an analog-to-digital conversion module, both under control of the microprocessor. A pre-event data memory module stores the digitized signals sent along a separate data bus by the analog-to-digital conversion module. Data stored in data memory module is analyzed by the microprocessor for information regarding disposition of data which includes archival storage on an internal data recorder using the data bus or transmission to desired external recorder using various possible modems. The microprocessor is also connected to an external time reference module, an automatic calibration module, and an operator interface module.

15 Claims, 12 Drawing Figures

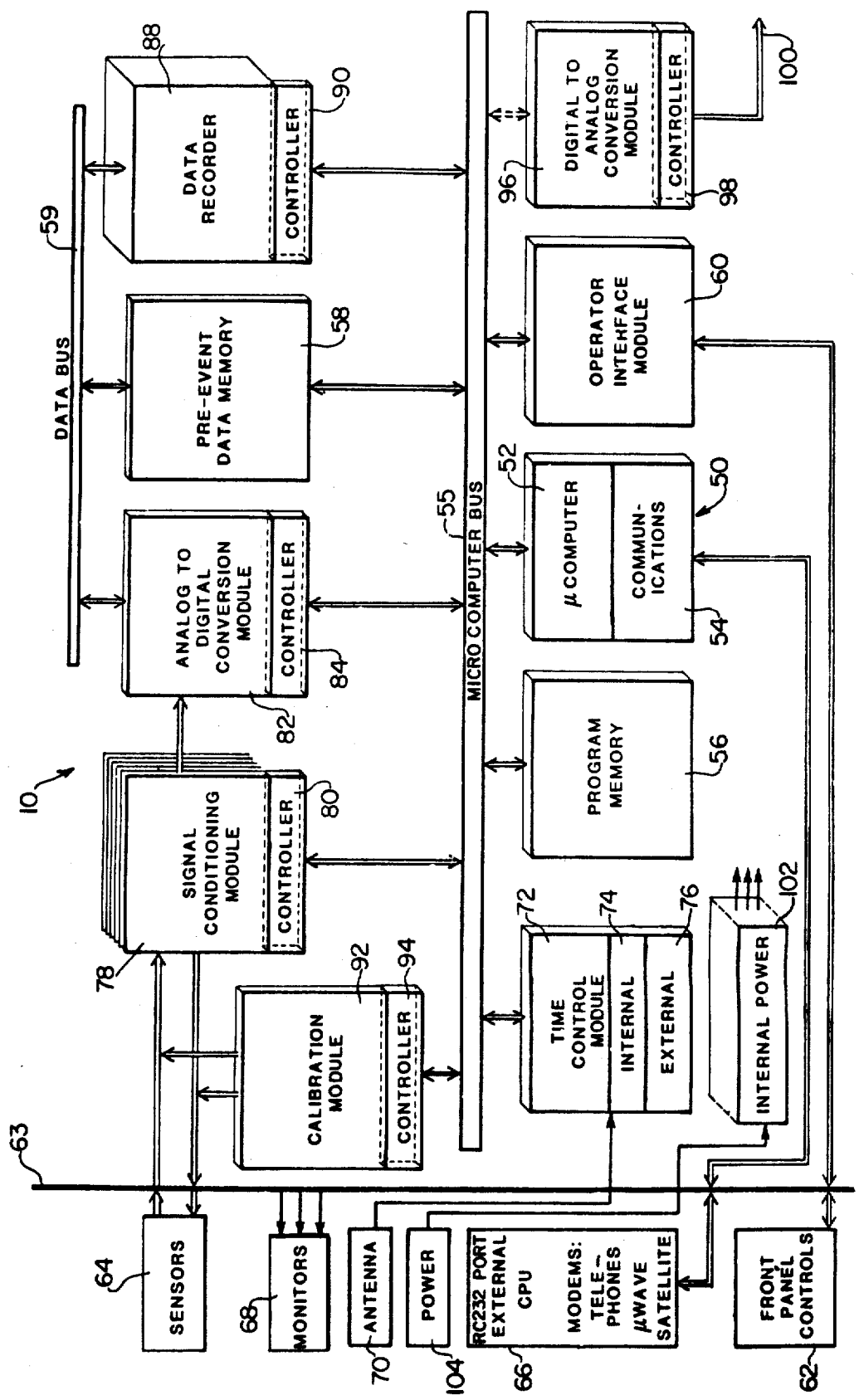

GENERAL EARTHQUAKE OBSERVATION SYSTEM

FIELD OF THE INVENTION

The present invention relates to a general earthquake observation system, and in particular relates to a computerized system for monitoring, recording and/or transmitting a wide variety of seismic signals. In a particular embodiment, the present invention relates to a portable computerized system for general seismic data acquisition purposes.

BACKGROUND OF THE INVENTION

Major functions required of a digital seismic data acquisition system include signal conditioning of analog sensor outputs, digital conversion of analog signals, external time reference, event detection, pre-event memory, data storage, operator interface, data archival and retrieval and system calibration. Such a system finds utilization for recording and analyzing all types of seismic data in the fields of seismology, geophysics, and engineering.

Previous system designs are generally more difficult to operate, have a factor sixteen less resolution, have a less than desirable digitization rate and data capacity, and/or generally not completely portable. A desirable general earthquake observation system for use in a wide variety of passive and active seismic experiments requires portability and the requisite low power requirements, a wide dynamic range, a high data resolution, a broad frequency band width, a large data storage capacity, an accurate and adjustable time standard, selectable signals from sensors, and an interactive capability permitting easy operator control and input. Unfortunately, no system is known to exist which provides all of these desirable features.

SUMMARY OF THE INVENTION

It is, therefore, a feature of the present invention to have an integrated, interactive seismic data acquisition system that provides a much greater degree of system flexibility in both performance and range of application than previously possible with conventional, hard wired systems. Further, it is a feature of the present invention to have an intelligent, seismic data acquisition system that is under computer software control in which the hardware is of modular construction and which is centrally controlled by a microprocessor. It is a further feature of the present invention to have English language, interactive operation commands and a portable system that can be operated by lessor skilled personnel.

The present invention provides a system for use in a wide range of seismic studies including: strong-motion, structural response, aftershock, reflection-refraction, teleseismic, near-surface seismic exploration, hydrofrac, and free-oscillations. The present system can be used in either an observatory setting, or as a portable, low-power recorder for extended deployment in remote locations. Some specific applications of the present system include: near-source strong-motion studies; structural vibration studies; crustal refraction; micro-earthquake studies; and teleseismic studies.

A particular embodiment of the present invention incorporates a plurality of hardware modules operated through a computer bus under the central control of a microprocessor operated by dynamic, and interactive software with rapid data transfer via dedicated data bus and with communication capabilities through a digital input output bus. Specific hardware modules in accordance with this specific embodiment include a signal conditioning module with software adjustable gains and antialiasing filters; an analog-to-digital module with software adjustable sampling rates, selectable data channels, and data resolution; a temporary data buffer module with software adjustable capacity and facility for communication with an external central processing unit; a high-speed mass storage buffer with software selectable operational parameters and the capability of utilizing a variety of memory media (e.g. tape, disc, bubble memory, and internal ram memory); a time control module for receiving and interpreting external time standards and deriving corrections for an internal time standard; an operator interface module for interactive display and selection of parameters used for software control of the other modules; and a system calibration and test module with software selectable input signals for calibration of the external sensors.

The above specific embodiment has a broad range of land-based applications including micro-earthquake studies at distances less than 5 km, crustal refraction studies, strong motion studies, and near-surface seismic exploration studies. It is seen that the present system accomplishes these objectives through central control with a microprocessor base microcomputer of modular design thereby providing maximum adaptability and ease of modification for different applications. In addition, the present invention provides a system having a high dynamic range and wide frequency response; offering complete portability to the extent that the entire unit can be placed under the seat of an airplane; and that is self-triggering, has low power, and can be produced at a modest cost.

Other features, advantages and objects of the present invention will be set forth in or will become apparent from the detailed description of the presently preferred embodiment set forth hereinbelow.

BRIEF DESCRIPTION OF THE DRAWINGS

With reference now to the figures wherein like numerals represent like elements throughout the several views.

DETAILED DESCRIPTION OF THE PREFERRED EMBODIMENT

Figure 1:
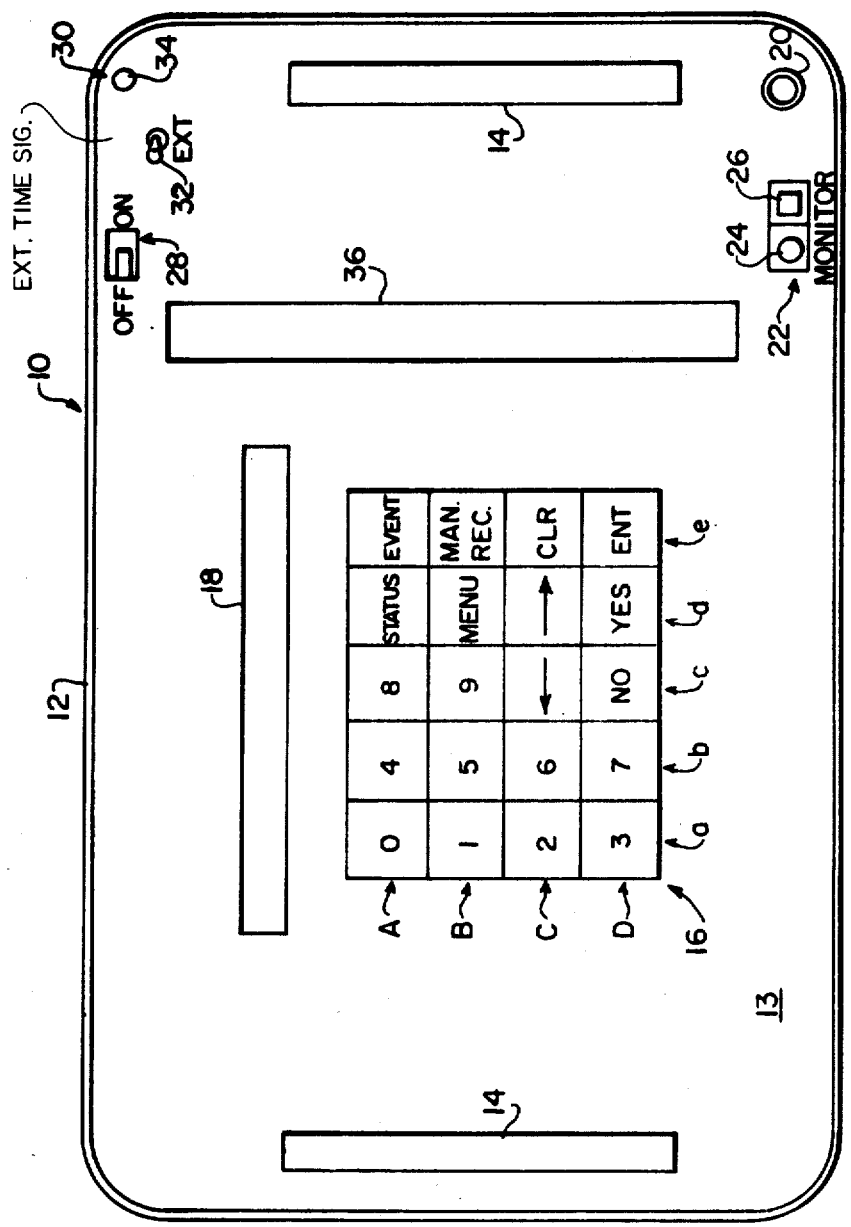
FIG. 1 is a front elevational view of the front panel of a portable microcomputer earthquake observation system according to the present invention.

With reference now to FIG. 1, a microprocessor based microcomputer system 10 is depicted and will be described in greater detail hereinbelow. The architecture of the system centers around a 12 bit word Intersil IM 6100 microprocessor and associated chip set. The present system can programmably monitor up to 6 analog earthquake sensors of either the velocity transducer type or the force balance accelerometer type, and upon detection of seismic activity, as determined by the particular software detection algorithm, can record the digital version of the event.

System 10 is entirely contained inside a portable, waterproof carrying case 12 preferably made of aluminum. Exemplary dimensions of the case are 20½" long, 9⅞" wide, 13¾" high and an exemplary weight is 47 lbs. with internal batteries installed. Carrying case 12 is provided with a cover (not shown) and the microcomputer electronics are rigidly mounted inside.

Operator accessible controls for system 10 are mounted on a front panel 13 which also includes a pair of handles 14. The controls include an input keyboard 16 and an output display 18. Keyboard 16 is comprised of twenty, individually operable keys arranged in a 4×5 matrix. For purposes of description, the rows of keyboard 16 are identified by an upper case letter from "A" to "D", and the columns are identified by a lower case letter from "a" to "e". Thus, for example, the number 5 key will be identified as key Bb and the "CLR" key will be identified as key Ce. Display 18 in the present embodiment is an alphanumeric, 32 character display preferably using 18 segments with a character height of 0.15 inches. In this embodiment the characters in display 18 are an LED with an optical filter.

A monitor or oscilloscope can be connected to system 10 to display the analog version of the recorded digital signal through a conventional coupling 20. The particular signal sent out coupling 20 is determined by a monitor control 22. Monitor control 22, in turn, includes a pushbutton switch 24 and an alphanumeric single digit readout 26.

System power can be turned on and off with switch 28. In addition, a time control 30 is provided for determining the origin of a time synchronization signal. Time control 30 is comprised of a two position, toggle switch 32 and a red indicating light 34. With toggle switch 32 in the upper position, a radio signal received from broadcast station WWVB will be received and supplied to the system for synchronizing the internal time clock. During the synchronization process, light 34 will flash and upon synchronization will be off. With toggle switch 32 in the lower position, any externally supplied time signal can be provided and the system synchronized to it.

The face of case 12 is also provided with a slot 36 for receiving a digital tape cartridge (not shown). Preferably the cartridge is a commercially available type, such as 3M type DC 300 with up to 450 feet of tape capable of storing 1600 bpi. Located inside case 12 is a conventional, computer controllable tape drive (not shown). The tape drive can have an exemplary drive speed of 30 ips write or read.

Figures 1, 11:
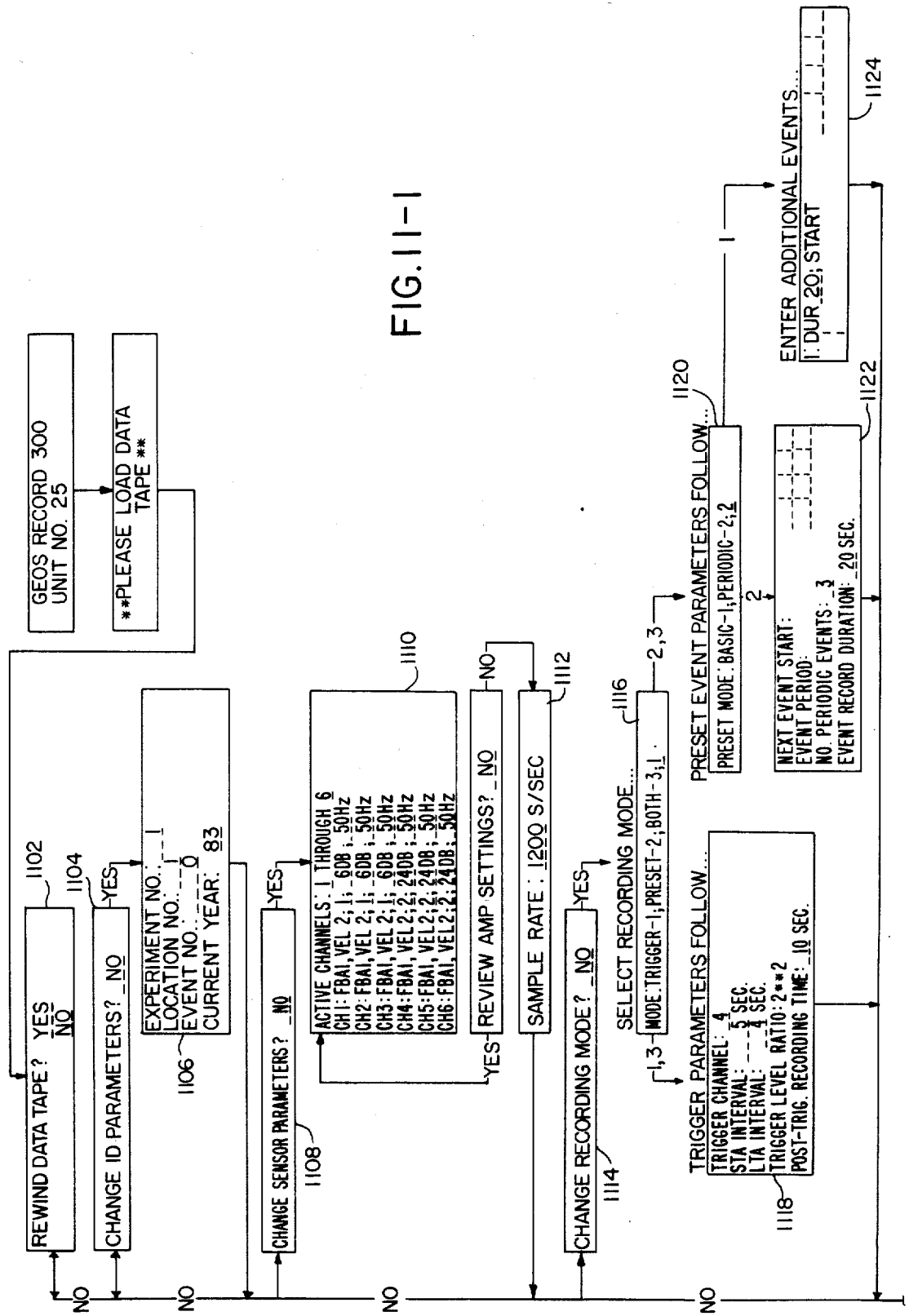
FIG. 11 is an input/output flow chart depicting the communications between the system and the operator during the system setup phase in which the parameters are established.
Figures 2, 11:
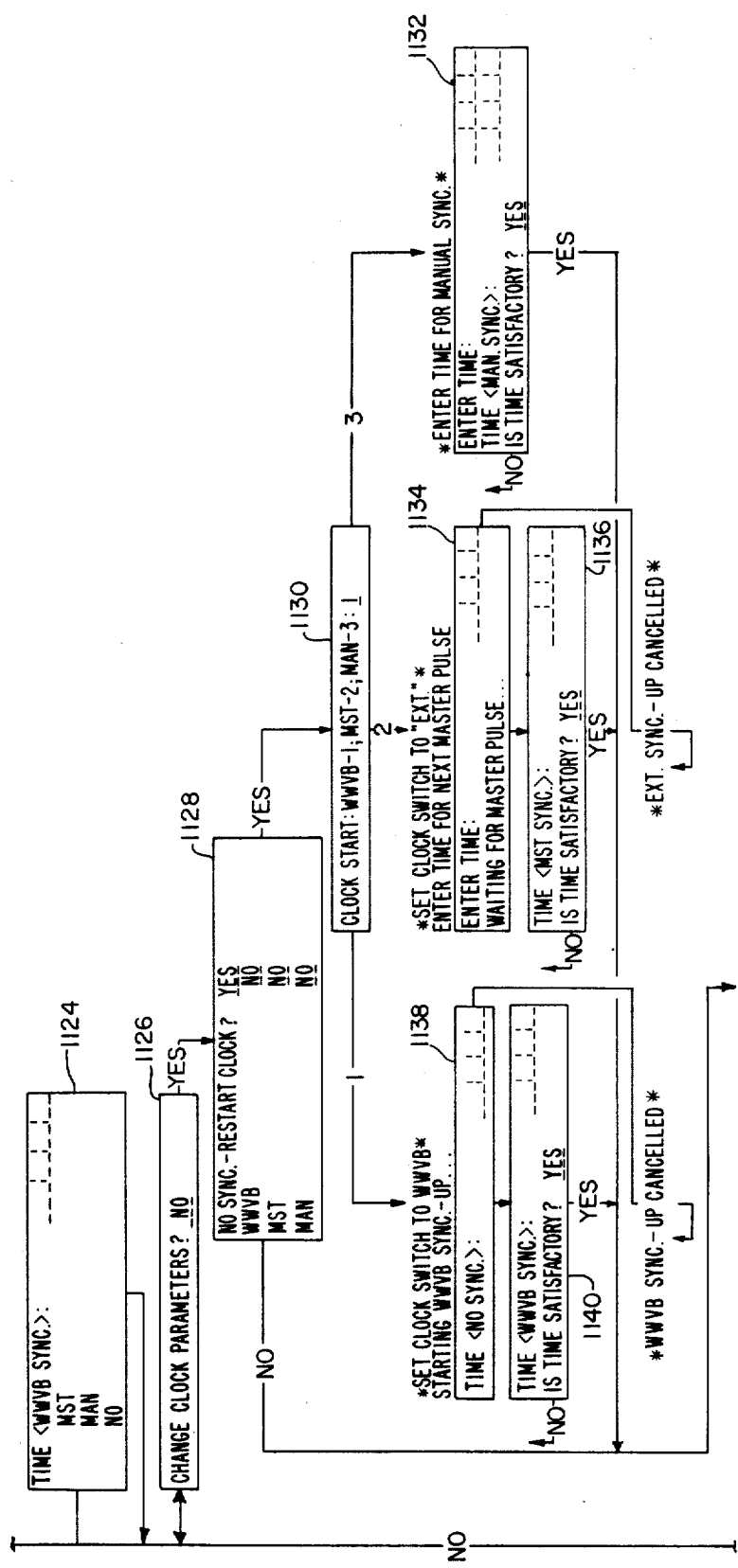
FIG. 2 is an electrical schematic block diagram of the microcomputer system illustrating system functions and corresponding hardware modules under control of a central microcomputer via a general computer bus.
Figures 3, 11:
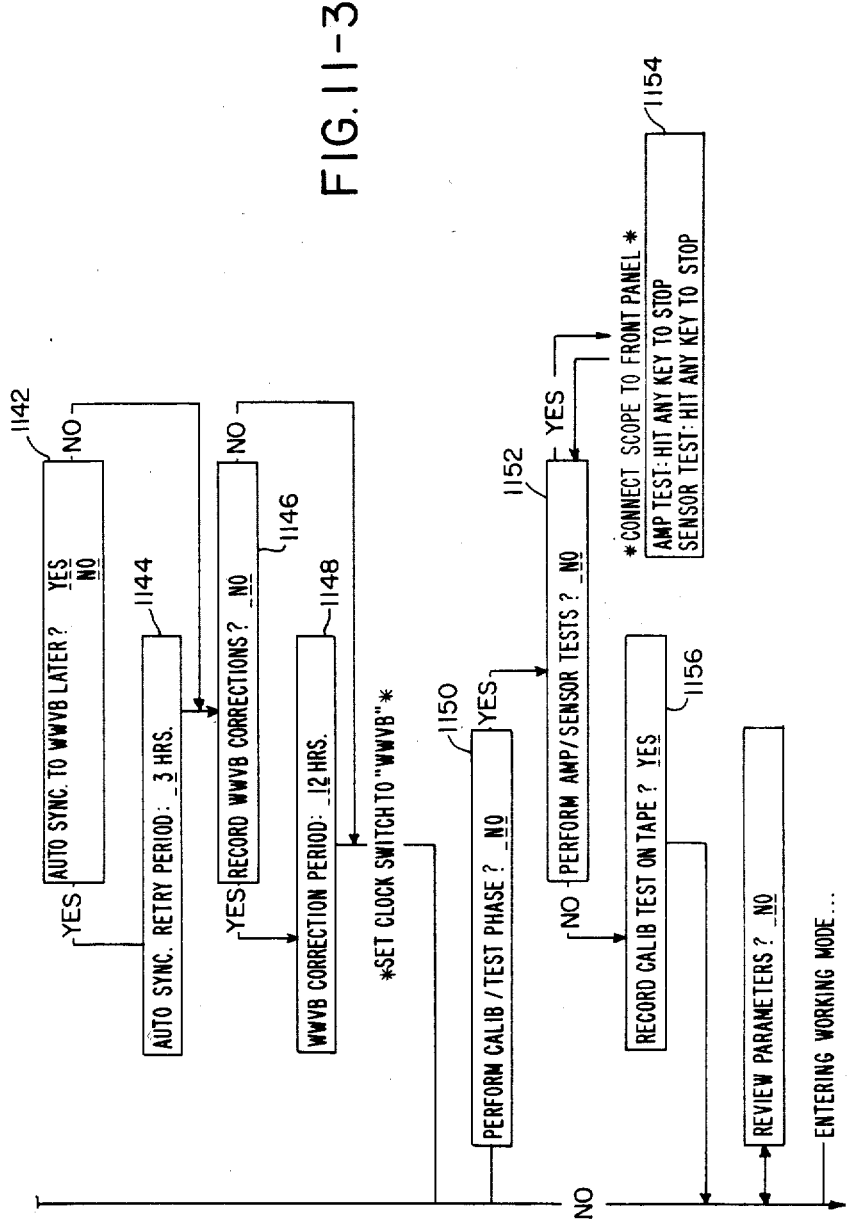

Turning now to FIG. 2, there is depicted an electrical schematic of the modularized microcomputer based system. Central to the system is a CPU module 50 that is comprised of a microcomputer section 52 and a communications section 54. The microcomputer section 52 is comprised of the Intersil 6100 CPU system that includes the IM-6100-1 CPU, a 6102 memory extension/DMA controller/interval timer (MEDIC), a 6101 Parallel Interface Element (PIE), a 4702 bit rate interval timer, a 4702 bit rate generator and appropriate buffering to a microcomputer bus 55 with 6432 bi-directional bus driver integrated circuit chips. Interfaces between the CPU and the timer chips are specified in the Intersil 6100 documentation. Clock information is provided to the interval timer from an external 1 MHz source.

Communication section 54 is provided with an RS232 interface and includes a 6402 UART together with a 8T16 and an 8T15 RS232 receiver and driver chips. The UART is controlled through the PIE to provide communication with an external modem. Interfaces between the PIE and the UART are specified in the commercially available Intersil and Harris documentation except for one difference. This difference is the Flag 1 bit provided by the PIE, which in the present case is used to switch the plus and minus 12 volts and the plus 5 volts power to the RS232 interfaces. This was done because both the PIE and the UART are large consumers of power with respect to the other circuits and therefore power should be disabled to these devices when they are not in use. The RS232 interface provides only data-in and data-out capability. An appropriate device select code, the mode rate select input, the UART word length, the Stop bit selection, and the parity programming inputs are conventionally selected depending upon the outside communication requirements.

Microcomputer bus 55 is a 100 pin bus for providing the standard Intersil signals. The particular pinouts are depicted in Appendix 1.

Real time data and program storage is provided by a program memory 56. Program memory 56 is comprised of a 4K twelve bit word RAM section and an 8K twelve bit word EPROM section. The RAM section is comprised of twelve 6504 static CMOS 4096×1 RAM integrated circuit chips. Field selection is provided by a 6440 decoder integrated circuit chip driven by the three EMA input lines. The field jumper is connected so as to assign a field selection of Q. Address and data into and out of the RAM section of program memory 56 is buffered to microcomputer bus 55 through two 6433 Bus Driver/Separator integrated circuit chips. Memory timing and control are provided according to the standard signal protocol as described in the Intersil 6100 literature.

The EPROM (Erasable/Programmable Read-Only Memory) section of program memory 56 contains the operational software and is comprised of 24 Intersil IM 6653, 1K×4 EPROM integrated circuit chips organized in two banks of 4K by 12 bits. A power control feature is included to permit the plus 5 volt power supply to be disabled during periods when this memory is not in use. The signal is provided over pin 62 on microcomputer bus 55 and controls a transistor switch (such as a PN3644) connected between the plus 5 volt power supplied to the board and the EPROM's. Unswitched plus 5 volts is provided to the remaining integrated circuit chips on the board. Interface to microcomputer bus 55 is provided by three 6433 bus separators/driver integrated circuit chips which separate the data output from memory from the address inputs. Address field selection is made by decoding the three signal EMA input lines in a 6440 decoder integrated circuit chip. The two banks of memory are currently assigned to fields 3 and 4. The banks are jumper selectable and can be assigned to any field. The output of the EMA 6440 decoder chip drives two additional 6440 decoder chips which in turn decode address bits 0 and 1. These address bits determine which 1K segment of memory is to be addressed. Each EPROM chip is driven with address bits 2 through 11 providing decoding for addressing within each 1K increment. Input/output timing is determined by the standard signals XTB, LXMAR*, and MEMSEL* signals from the CPU and PIE integrated circuit chips located on CPU module 50. Signal LXMAR* is buffered after it enters the EPROM section of program memory 56 by a 6495 driver chip because it has to be used in all of the memory chips.

A second computer memory is tied to microcomputer bus 55 to permit Direct Memory Access (DMA) of the information stored therein. This memory, a pre-event data memory 58, contains 4K of 16 bit data and is comprised of sixteen 6543 4096×1 RAM integrated circuit chips. These chips have been assigned to field 7 of the system memory map.

A separate, 16 bit data bus 59 is used to store data in data memory 58 on a cycle-steal DMA basis. The data pinouts on bus 59 are denoted DA 0-15, and data can be either read out in a twelve bit format under control of the microprocessor or directed by the microprocessor to be transferred directly in 16 bit format back onto data bus 59. Data memory 58 is primarily used to store sampled and digitized sensor information in a 16 bit format. Data from the processor can also be written into the 16 bit fields by means of appropriate commands.

Address selection to data memory 58 takes place through microcomputer bus 55 by means of dual 6495 address buffers. The twelve bits from bus pinouts 9 through 20 (signals ADR 0-11) in combination with field select lines derived from the 6440 DMA decoder select the appropriate address in data memory 58. Depending upon the state of signal XTC* data is either read into or out of the selected address and appears on data bus 59 lines DA 0-15. The bi-directional data lines drive seven 6433 bi-directional bus drivers and one 74175 latch I.C. chip. These eight integrated circuit chips comprise the high byte and low byte interfaces to microcomputer bus 55. The low byte, when referred to in a context of the data memory 58 data lines, comprises lines DA 4-15, and the high byte is comprised of data lines DA 0-11.

Reading or writing to the 16 bit data memory 58 from the microprocessor proceeds as follows. The program first determines if a low byte or a high byte of the 16 bit word is to be addressed. The program then makes a low byte selection by re-setting signal Flag 1 of the PIE. This enables the low byte select line into a 74C10 gate, and allows the signal MEMSEL* to enable the lower two 6432 bus drivers and the 6495 bus interface. In a low byte Write operation, the program next writes the data to appear in address signals DA 0-3 into the microcomputer bus 55 bits 0-3 and strobes the signal Write 1 output of the PIE. This information is then latched into a 74C175 D type flip-flop. The computer program may then proceed to do a memory Write operation as it normally does to enter fields 6 or 7. The information to be placed in data memory 58 is placed on data lines DA 4-15 of microcomputer bus 55 bits 0-11, respectively. On the rising edge of the signal MEMSEL*, which is associated with the Write sequence, the information contained in the latched flip-flop and bits 0-11 of microcomputer bus 55 are written into the appropriate address of data memory 58. If it is desired to transfer information into or out of data memory 58 bits 0-11, then the signal Flag 1 output of the PIE is enabled. This signal disables the low byte select and enables the high byte select of pin 9 of the 74C10 gate. The subsequent signal MEMSEL* is then gated through to the upper three 6432 bi-directional bus drivers.

During cycle-steal direct memory transfers, the address lines of data memory 58 are isolated from microcomputer bus 55 by signal DMAGNT. During these transfers, the address bits and the DMA lines are driven by an A/D address counter output (described below), thereby making a connection to microcomputer bus 55 unnecessary.

Housekeeping control, boot-up functions, and operator communication to system 10 is provided by an operator interface module 60 and front panel controls 62. Many of the front panel controls were discussed above with respect to FIG. 1. Operator interface module 60 serves three main purposes: one purpose being to contain a computer program for debugging the system; a second purpose being to contain sufficient software in a bootstrap memory to permit the operator to select the operational software and the locating of media from which to retrieve the operational software (e.g. on magnetic tape or in program memory 56); and a third purpose being to provide user interaction with the computer through a keyboard and LED display interface.

The memory contained in interface module 60 is comprised of 2K×12 bits of EPROM and 128×12 bits of RAM. This memory is normally completely transparent to the normal user memory system and becomes activated only upon the generation of signal CPSEL*, which appears on bus pinout 66. The EPROM occupies the upper 16 pages (octal 40007777) and the RAM page 0 (octal 0-177). The memory system is buffered from microcomputer bus 55 through tri-state bi-directional bus drivers. Data is allowed into the memory system during the time signal XTB is active and is allowed out of the memory system when signal CPSEL* is active and signal XTC* is inactive (i.e. signal CPSEL* is low and signal XTC* is high). Both EPROM and RAM memories have internal address latches which latch the address using signal LXMAR from pinout 80 on microcomputer bus 55.

Interface module 60 has absolute control over three of the microprocess control lines, namely signals RESET, RUN/HALT, and CPREQ*. During power-up, the microprocessor is held in a reset state for approximately 100 milliseconds, at which time the RUN/HALT line and the CPREQ lines are pulsed, respectively putting the microprocessor in the run mode and causing program execution to begin in the boot strap memory.

A separate input/output plug is provided on module 60 into which a DEBUG CONTROL PANEL can be plugged and which provides access to the debug software. Under software control, through a 6101 parallel interface element, (PIE), the microprocessor can be single-stepped through its operational program or run at a real time rate with interrupts to access the bootstrap memory every 35 milliseconds for display of registers or memory locations. The DEBUG CONTROL PANEL is provided with three pushbutton switches to reset the microprocessor to halt or run the microprocessor, and to start the boot strap software. In addition, two single-pole single-throw switches are also included to disable or enable the debug software and to select which storage device will be activated to load program memory 56 (from RS232 port or the magnetic tape cartridge unit).

Operator interface module 60 also includes circuitry for connecting keyboard 16 to microcomputer bus 55. The circuitry includes a 74C923 key encoder. This encoder in turn produce a data available signal to a Parallel Interface Element IM6101 integrated circuit chip (PIE) and data to a HD6495 buffer integrated circuit chip. The data from microcomputer bus 55 can be transferred to a further bus (not shown) through two D type flip-flops acting as latches. These latches are latched upon a Write signal generated by the PIE. The further bus provides the data and certain control signals also generated by the PIE to a HDSP 8732. Finally, interface module 60 is also provided with a controllable power supply for the display controlled by signal Flag 1.

The microcomputer interface between system 10 and external components is indicated by the numeral 63. Thus, front panel control 62 is connected through interface 63 to module 60.

Also connected to system 10 through interface 63 are a plurality of sensors 64; the aforementioned RS232 port to which an external CPU, modems, telephones, microwave transmission systems and a satellite receiving system can be connected; a monitor 68; and a radio antenna 70. The RS232 port 66 is connected through interface 63 to CPU module 50, as described above. Similarly, the connection to monitor 68 has been described above with respect to coupling 20 in FIG. 1. Radio antenna 70 provides an external time signal from radio station WWVB through interface 63 to a time control module 72, which in turn is coupled to microcomputer bus 55.

Time control module 72 has four main function: first to generate reference frequencies of 3 MHz, 1 MHz and 1 Hz and to count milliseconds for the system clock; second, to control power to the WWVB receiver and to decode its output signal; third to measure the time difference between the system clock and the WWVB time code or an external time mark; and fourth to convert the battery voltage to other voltages necessary to power the rest of the sytem.

A 3 MHz frequency is generated by a Vectron temperature-controlled crystal oscillator and is buffered to bus 55 through an inverter for use by the microcomputer module 52. This frequency is divided by 3 to produce a 1 MHz signal which is also buffered to bus 55 through an inverter for use by the A/D controller module 84. The 1 MHz frequency is divided by 1000 by a series of decade dividers to produce a frequency of 1 KHz. This frequency is counted by a series of binary counters which can be read by the microprocessor to determine the current time to the nearest millisecond. Time control module 72 contains a 6101 PIE whose READ 1 output is used to put the output of the millisecond counter onto bus 55. When the count in the counters reaches 1000 a NAND gate causes the counters to reset to zero. The 1 Hz output of the millisecond counter is connected to the SENSE 4 input of the PIE which allows the microprocessor to detect it. By counting these pulses, the microprocessor keeps track of the seconds, minutes, hours and days in program memory. Two 74C174 six-bit latch integrated circuit chips are connected to the outputs of the millisecond counter and are capable of latching the current millisecond count. Control of this latching as well as control of counter resetting can be either internal from the PIE under processor control or from an external source (e.g. the WWVB time code). Control is determined by the PIE signal FLAG 2 for resetting and the signal FLAG 3 for latching. A low output enables internal control and a high output enables external control. When internal control is selected, PIE signal WRITE 1 performs the reset function and PIE signal WRITE 2 performs the latching function. This controllable switching is implemented with 74C00 NAND gates and allows the microprocessor to start its internal clock itself, to synchronize its internal clock to an external reference, to note the time relative to the internal clock of an internal event, or to compare the internal clock to an external reference to measure the difference up to plus or minus 500 ms.

The signal Flag 1 from the PIE is used to control the power to the WWVB receiver. The PIE signal Sense 2 input monitors the WWVB or other external time signal after it has passed through an inverting Schmitt-Trigger buffer. The time code output from the WWVB receiver is sampled and shifted through a 74C174 five stage shift register at a 100 Hz rate. The outputs of each stage in the five stage register are monitored by a 5 input majority logic gate (e.g. a MC14530B integrated circuit chip) whose output is equal to the majority of the five inputs. This scheme is utilized to descriminate against dropouts in the WWVB time code due, for example, to noise spikes or similar interference. The falling edgeon the output of the majority logic gate is monitored by the signal Sense 1 input to the PIE as the WWVB 1 pps indication. When this time code signal goes low, two 74C221 one-shots are triggered. These one-shots have periods of 350 ms. and 650 ms., and thus can discriminate between the three WWVB pulse widths of 200 ms., 500 ms. and 800 ms. When the one pps signal makes a low to high transition, PIE signal Sense 1 informs the microprocessor, and the outputs of two one shots are latched in a register. The microprocessor then has the opportunity to read the time code data that is stored in a two bit latch (e.g. a 74C74 chip) along with the millisecond count using the signal Read 1 from the PIE. In addition to these timing functions, module 72 also includes two DC-to-DC converters which transform the 24 volt battery voltage to plus and minus 12 volts and plus and minus 5 volts. These voltages along with the 24 volts are placed on bus 55 to power the entire system.

The signal from sensors 64 is sent to a signal conditioning module 78 that is connected to microcomputer bus 55 through a controller 80. Signal conditioning module 78 is comprised of several major circuits including an input amplifier and protection circuit, filter circuits, an output buffer, and relays. The input amplifier and protection circuit presents a high impedance load to sensors 64 and utilizes a balanced input to null out common mode signals. Each side of the input signal has a transient suppressor to ground, and there is a transient suppressor across the inputs to protect against excessive differential signals. The gain of the input amplifiers is selected by activating one of 10 relays. With all relays open, the gain is 0 dB, and with the highest level relay closed, the gain is 60 dB. The filters are 7 pole Butterworth, lowpass filters which provide a 42 dB/octave rolloff in the stopband. These filters provide the best compromise for group delay distortion and rejection of the aliasing components. The output buffer provides a low impedance source to drive the other components of system 10. This buffer is AC coupled on its input to remove any DC offsets in the input amplifier or filter circuits. The offset voltage of the buffer is nulled and remains at 1 LSB or less over the designed temperature range. The relay switches are driven by signals from controller 80 and thus are under micro processor control. In a presently preferred embodiment, controllers 80 and 94 can be combined into a single circuit module. The relays are magnetically latched reed relays which provide a reduced power consumption and a temperature independent switching resistance. The specifications for signal conditioning module 78 are set forth in greater detail in the system specifications in appendix I.

Controller 80 is comprised of decoding, latching and power switching circuits for controlling the relays in signal conditioning module 78. The signals on microcomputer bus 55 are monitored and when controller module 80 is being addressed, the information is latched and decoded to select the particular filter to be activated. The latching signal is then transformed into the voltage necessary to actuate the relays and then provided to the appropriate delay during a timed sequence. The composition and operation of controller 80 is described more fully in the below description of controller 94.

The output from signal conditioning modules 78 is provided to an analog-to-digital conversion module 82 which is controlled by the microprocessor through a controller 84 connected to microcomputer bus 55. Module 82 is a conventional analog-to-digital converter (ADC) capable of converting an analog input signal having a voltage range of + to −8.192 volts full scale and a bias current that is sufficiently low to provide a plus or minus ½ least significant bit accuracy. Such a converter is commercially available from the Phoenix Data Corporation. Such a converter provides a latched 16 bit data word to a tri-state buffer connected to data bus 59. Conversion module 82 also includes an analog multiplexer connected to receive the outputs from signal conditioning module 78 and to present one of those outputs to the analog to digital converter.

Controller 84 provides interface signals for the ADC, data memory 58 and the 16 bit data bus 59 and microcomputer bus 55. Controller 84 contains all of the circuitry necessary to generate analog-to-digital sample strobes at software selectable rates of between 1200 samples per second and 0.29 samples per second. Controller 84 includes a DMA word count register and a current address register (e.g. 74C193 counters), an analog input port select register (e.g. a 74C175 latch coupled to a 74C193 counter) controlled by an input port select cycle counter (e.g. a 74C175 latch coupled to a 4526 counter), and a 6101 Programmable Interface Element (PIE) which provides interface to the control logic. The port select register and the port select counter contain the information of the lowest numbered port to be sampled and the total number of ports to be scanned.

Controller 84 also includes a programmable divider circuit that is comprised of a plurality of 4526B programmable divider integrated circuit chips and a programmable divider register that is comprised of three 74C175 flip flops that act as a holding register for the modulus of the programmable divider. A 1200 Hz clock input for the programmable divider is generated by a fixed divider that is comprised of 74C90 and 4569 divider chips. The divider receives the 3 MHz clock signal from microcomputer bus 55 and divides it by the number 2500 to generate the 1200 Hz input for the programmable divider. Finally, controller 84 contains logic circuitry to generate other system signals.

Operation of controller 84 is as follows. The microprocessor under control of the computer programs stored in program memory 56 causes the PIE to load the DMA word count register with the word count and loads the current address register with the starting address for data storage in data memory 58. The DMA word count is expressed as the two's compliment of the number of transfers the program is to perform. The microprocessor also loads the number of the lowest input analog port that is to be scanned in the input port select register, the number having been determined at the system startup and loads the total number of ports to be scanned in the input select cycle counter. For example, if the operator has initialized the system with inputs 2, 3, and 4 to be scanned sequentially, the microprocessor under the computer program control loads the binary number 2 in the input port select register. The microprocessor would then load the binary number 3 into the input select cycle counter. The microprocessor then loads the programmable divider register if that has not already been done. Programmable binary submultiples of the input 1200 sample per second signal appear at the output of the divider. The pulse width is then shortened by a 74C221 one-shot, which generates a "Start Conversion" pulse for the A/D converter.

The specific operation of controller 84 is as follows. A sample pulse from the programmable divider fires a one-shot to generate the Start Conversion Pulse, which is a positive going pulse. The negative going pulse from this same one-shot is used to increment the DMA word count stored in the word count register. A carry signal from this register is connected to the PIE to set the signal Sense 1, causing an interrupt to the microprocessor. When the A/D has finished the conversion, a negative-going "Busy" pulse is generated and is used to trigger another one-shot. The Q* output of this one-shot sets a flip-flop that provides a DMA request signal, DMAREQ. When the signal DMAREQ goes low, the microprocessor will issue a positive going DMA grant signal, called signal DMAGNT, during the next T1 state. The signal DMAGNT and signal XTC* then enable an address register gate. The address register gate in turn enables buffers connected to the outputs of the current address register, which gate the data memory address onto data bus 59. Another gate is enabled by signal DMAGNT, the other input of which passes signal XTA through the gate and which becomes signal DMALXMA (Direct Memory Access Load External Memory Address). The DMA address is latched into the RAM memory section of pre-event data memory 58 on the trailing edge of the DMALXMA pulse. A further gate is enabled by signal DMAGNT, the other input of which is signal XTC. When signal XTC goes low, this further gate generates a low-going output enable signal that is sent to the A/D converter. At this point, the digitized data generated by the A/D converter is available on data bus 59 in a stable state.

A further monostable multivibrator or one-shot in the circuitry of controller 84 is triggered by the negative-going signal XTC and generates a 0.6 microsecond negative-going pulse at the Q* output that is used as the DMA Memory Select Signal or DMAMEMSEL signal. This one-shot times out at approximately time T5 in the DMA cycle and the positive-going edge of the pulse then clocks the data into data memory 58. At the same time, the Q output of this one-shot is inverted and is used to increment the input port select register, thereby selecting the next sequential analog input port. The DMA cycle is then complete which is indicated by signal DMAGNT going low.

Signal DMAGNT is also inverted to produce signal DMAGNT*, which is connected to the count down input of the input select cycle counter. Signal DMAGNT* is also used to clear or reset the DMA request flip-flop. Should the input select cycle counter be rolled over to zero when it is decremented, a negative-going pulse is provided to the load inputs of port select register and the input select cycle counter which reload the latched values into their respective counters and restart the input select cycle sequence. That concludes the entire sequence of operation until the next sample rate pulse is received from the programmable divider.

Thus, it is seen that a signal from sensor 64 is filtered and digitized to 16 bit accuracy by a A/D conversion module 82 and stored through a cycle-steal DMA operation into data memory 58. Sample rate of conversion module 82 is programmable by the operator during system set-up from 1200 to 0.3 samples per second. The microcomputer uses a processing algorithm that is tailored to each operation to continuously analyze the signal data to check for seismic activity. Should seismic activity be detected, the processor causes the 16 bit data to be transferred immediately to a data recorder 88 through data bus 59. Also transferred to data recorder 88 is the precise time and logging information derived from the precision clock in time control module 72. It is noted that there is no conflict between data memory 58 and program memory 56 by using the same address bus during a DMA operation because DMA operations are only accomplished to and from data memory 58 at a time when the microprocessor is not using address information.

Data recorder 88 is under the microprocessor control operating through a data recorder controller 90 that communicates with microcomputer bus 55. Data recorder 88 records on a master-slave configuration of recorders. The master recorder can be any suitable, commercially available cartridge, cassette, bubble memory or solid state memory recorder, such as a Kennedy 631 cartridge recorder. Recorder 88 can also be used to store computer programs to be transferred to the RAM section of program memory 56. Data recorder 88 also can be controlled to rewind automatically the cartridge tape upon command from the microprocessor. Header information that is generally recorded on the cartridge tape includes the project code, the unit identification, the system configuration (e.g. number of channels, sensor type), sample rate, filter identification, gain identification, run number, time, timing corrections, battery voltage, temperature, calibration parameters, and any additional, desired information. This information is stored in the RAM section of program memory 56 and written onto the cartridge tape under command of the microprocessor.

Calibration and checking of the system can be accomplished through calibration module 92 under the control of the microprocessor through a controller 94. Calibration module 92 is connected to both sensors 64 and signal conditioning module 78 and permits calibration of both the external seismic sensors and the internal amplifiers. Calibration module 92 includes three relays and current programming resistors for each of the six channels. Velocity transducers either with or without separate calibration coils, and force balance accelerometers can be provided with calibration signals. Calibration of the velocity transducers is accomplished by applying a fixed current to either the main or calibration coil and then measuring the output as the coil relaxes. The calibration current is derived from a digital-to-analog converter (DAC) which is programmed by the microprocessor to produce a specific voltage. The output of the DAC is fed to a current programming resistor and then to the coil on the velocity transducer. The calibration current can thus be changed under microprocessor control by simply changing the digital input to the DAC. The force balance accelerometers are calibrated by switching plus 12 volts to the damped and the undamped control lines and measuring the resultant output signals. The internal amplifiers and A/D circuity is checked by switching the calibration DAC voltage to the input of the amplifiers and recording the A/D output. The relays are controlled by the same circuitry which controls the amplifier gain and filter relays.

Controller 94 includes essentially two circuits. One circuit is for controlling the relays associated with the calibration control and signaling routing circuitry. The other circuit is to generate an analog signal from digital inputs from the microprocessor for calibration purposes. The relays switching circuitry is basically an 18×7 relay matrix. The column relay select logic is comprised of 574C175 D-type flip-flops which drive three DS3631 open drain N channel buffers. A relay is selected by the microprocessor under control of the computer program by strobing the appropriate Dx data bit into the corresponding column flip-flop. A Write pulse on either Write 1 output or Write 2 output of one of the PIE's is generated. A low PIE signal Flag 3 directs the Write pulse through a 74C157 to the column flip-flops. This causes the column flip-flop to latch the data presented to it on the DX bus. The Q* output of the selected flip-flop pulls the input of the selected relay's driver low, thereby selecting the particular column. The selection of the appropriate row which represents a particular module (e.g. calibrator or one of the six signal conditioner channels) is similarly accomplished using similar hardware. The programmed microprocessor places the bit corresponding to the appropriate enabled bits for rows 1 through 7 on microcomputer bus 55. This information is latched in 74C175 flip-flops. The programmed microprocessor then strobes the PIE Write 1 output (PIE signal Flag 3 having been set high to direct the pulse to the row flip-flops), thereby affecting the transfer of the data on microcomputer bus 55 to the latches. The outputs of the latches are then used to enable a plurality of 74C00 gates. The Write 1 pulse also provides a pulse to a column of 74C00 gates. Those gates which have been enabled pass the pulse to a 74C906 and a PN 3644 transistor driver. The first pulse to be generated by the one-shot on the leading edge of the Write 1 pulse is bussed to the reset line of alternated 74C00 gates. When the pair of gates corresponding to the appropriate circuit is enabled, the circuit passes the first pulse through a 74C908 driver, for latching the signal conditioner relays onto the Reset side of all relays on the selected row. All relays are then pulsed to the reset state for the duration of the first pulse. The trailing edge of this first pulse then triggers the second half of the one-shots. This pulse also drives a 74C00 gate that corresponds to the Set side of the latching relay through the same interface. Those relays which have been selected through the column selection circuitry have the negative side of the Set coil pulled low. The pulse from the one-shot passes through the enabled gates on to the positive side of the Set coil of all relays in that particular circuit. The row of non-latching calibration relays is selected by the seventh bit of the row flip-flop which enables a 24 volt driver, comprised of a 74C906 and a PN3644 transistor, for the duration of the switching period. For both latching and non latching, only those relays with the negative side of the coil pulled low by the row relay selection circuits are switched.

Other circuitry includes a pair of 74C175 D-type flip-flop operating off the Write 2 output of the PIE directed by a high signal Flag 3. Data from the microcomputer bus 55 is strobed into these flip-flops on the signal Write 2 pulse. These data are then used to generate an analog calibration signal with an AD7541 D/A converter and an LM 4250 operational amplifier. A power switching circuit to disable the power to the calibration circuit is provided because these circuits are used only intermittantly. The control is provided through the Flag 1 bit of the PIE. Bus buffers of the 6432 type are driven by the signal DMAGNT and XTB as per standard 6100 interfacing protocol.

A digital-to-analog conversion module 96 and an associated controller 98 are also coupled to microcomputer bus 55 for playing back recorded seismic information from data memory 58 and providing a corresponding analog output signal suitable for driving an oscilloscope or chart recorder. Module 96 is not used in the recording version of system 10. The circuit modules used in the playback version is similar to the circuit modules used in the record version, except that calibration module 92, signal conditioning module 78 and A/D converter module 82 and their associated controllers are missing. In their place is the D/A conversion module 96 and its controller 98, which is a modified version of the A/D converter controller 84. This controller works the same way except that instead of transferring data from an A/D converter to pre-event memory 58, data is transferred from pre-event memory 58 to a series of six D/A converter integrated circuits (such as AD7546 integrated circuit chips) where they are latched. The 16-bit Digital-to-Analog Converter integrated circuit chips (DACs) receive and store digital information in their internal latches and convert it to a current proportional to the weighted value. This current is converted to a voltage and offset so that midscale (i.e. 1000 0000 0000 0000) is "0" volts. One-pole filters and buffer amplifiers receive the output of the DAC and remove step discontinuities.

The output from D/A conversion module 96 is coupled to an output 100. This output, in turn, is coupled to coupling 20 (FIG. 1) and monitor coupling 68.

System 10 is also provided with an internal power supply 102 that includes internal batteries. Preferably, five ampere-hour Gates type, 24 volt batteries are used. These batteries can operate the system for about three days. An external power supply 104 can be coupled through interface 63 to internal power supply 102 to either supplement, replace, or charge the batteries contained therein. Internal power supply 102 provides power to the power conversion circuitry in the time control module 72 which supplies the system plus 12 volts, minus 12 volts and plus 5 volts.

The preferred microprocessor based system 10 has been described above. Such a system when equipped with force balanced accelerometers and velocity transducers can record seismic signals ranging from the seismic background noise to M 8+ events on scale without any changes in instrument setting. Linear and wide dynamic ranges (e.g. 96 dB) are achieved by using a 16 bit CMOS analog-to-digital converter. Broad and variable band width is achieved with high digital throughput rates of 1200 samples per second using Direct Memory Access. Variable and selectable number of input channels allows the system to be used for a wide range of applications with most seismic sensors.

Computer compatibility and large data capacity are achieved by using a tape-cartridge recorder that writes or reads ANSI standard format in serpentine fashion. Tape lengths of up to 450 feet with 1600 bpi permit data storage of 1.88 million 16 byte samples with a provision made for two additional slave recorders. Read capability of the tape recorder allows recording parameters and software to be changed automatically and allows for the system to be used as a field playback unit or to be used with a modem to transmit data via satellite, microwave, or telephone to a central recording facility.

Operator interface is provided with a 32 character LED alphanumeric display and a keyboard using English language commands. Default perimeters are defined in ROM loaded software.

System 10 is comprised of low power components and automatic power disconnect and connect circuitry for the less used components so that up to three days of use on internal batteries can be achieved or up to several months if standard 12 volt car batteries are used.

The system also has a selectable time standard to permit the use of an internal WWVB receiver and circuitry to synchronize the internal clock with an external standard. In addition, time information can be entered manually.

The program software that is stored in program memory 56 or alternately loaded through data recorder 88 will now be described with reference to FIGS. 3 through 7.

Figure 3:
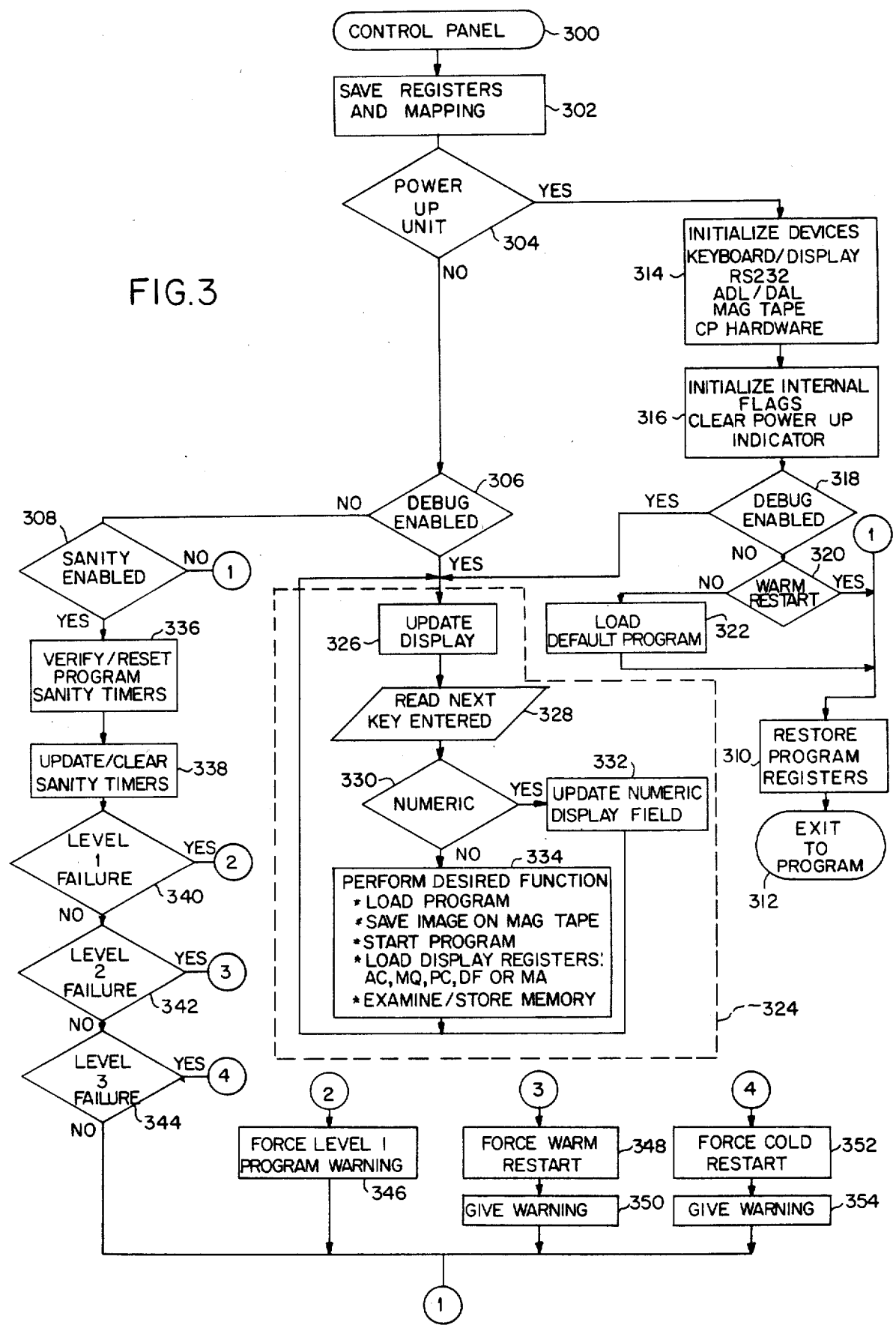
FIG. 3 is a flow chart of a computer program for overall system control.

With reference now to FIG. 3, the flow chart for the initial unit startup is depicted. Input provided by keyboard 16 (FIG. 1) and power on switch 28 causes the program to jump to a software entry point or terminal 300 and proceed to a first process box 302 where all registers and memory mapping is saved. From this point, the program enters three, serially arranged decision diamonds which are interconnected through the "no" decision. The first decision diamond 304 determines whether the system has been powered up and if not the program branches to decision diamond 306. In decision diamond 306, the program determines whether the debug control panel has been connected and the debug enable switch thrown to provide a debug enable signal. If the debug enable signal is not present, the program branches to decision diamond 308 where the program determines whether the sanity has been enabled. Sanity is enabled upon the discovery of a system failure. If sanity has not been enabled, the program branches through connector number 1 to process box 310 where the program registers are restored. The program then goes to terminal 312 where the program exits.

If the program determines in decision box 304 that the power-on the unit is up, the program branches to process box 314 where the devices are initialized. These devices include the keyboard and display, the RS232 modem, the Analog to Digital Converter (ADC) and Digital to Analog Converter (DAC), the magnetic tape controller, and the computer hardware. From process box 314, the program goes to process box 316 where the internal flags are initialized and the power-up indicator is cleared. From process box 316, the program enters a decision diamond 318 where the program again is asked whether the debug is enabled. If the debug is not enabled, the program branches to a decision diamond 320 where the program determines whether the present situation is the result of a warm restart. If the program decides that it is warm restart, then the program again branches to connector 1 and from there to process box 310 as described above. If it is not a warm restart, then the program branches to process box 322 where the default program is loaded. From there, the program again goes to connector number 1 and to process box 310.

The default program is described in greater detail hereinbelow with respect to FIG. 11. In FIG. 11, all default parameters are shown underlined in the various decision boxes. The default parameters are described below in greater detail. These parameters include the operation identification, the channels to which sensors are connected and type of sensor and the selected sensitivity of the sensors, the recording mode, the clock parameters and method of clock calibration, and whether a calibration or test is to be conducted.

Should the program decide in decision diamond 318 that the debug has been enabled, then the program branches to the CPINTERACT subroutine, indicated in dashed lines and denoted 324. Subroutine 324 is also entered from decision diamond 306 should the unit not be powered up. Subroutine 324 permits the operator to interact with the system using the aforedescribed debug panel. From decision diamond 306, the program branches to process box 326 where the display update subroutine is called (described hereinbelow with respect to FIG. 5). The program then goes through I/O box 328 where a key depressed on keyboard 16 (FIG. 1) is read. The keyboard and the subroutine for reading the keyboard is discussed in greater detail below with respect to FIG. 6.

Once the entered key has been read, the program enters decision diamond 330 to determine whether the entered key is a numeric key or whether it is a functional key. A numeric key causes the program to branch to process box 332 where the display is updated and the number entered on keyboard 16 is displayed on display 18 (FIG. 1). From process box 332, the program returns to the beginning point of subroutine 324 and enters process box 326. Should the entered key not be a numeric key, the program branches to process box 334 where the desired function is then performed. These functions include loading a program, saving an image on mag tape, starting the program, loading display registers, or examining or entering information into memory. Once the desired function is performed, the program returns to the beginning of subroutine 324.

Should the program decide in the sanity decision diamond 308 that sanity is enabled, the program branches to process box 336 where the program sanity location is verified and indicated. Thereupon, the program proceeds to process box 338 where the program updates or clears the sanity timers and then proceeds to a number of serially connected decision diamonds. The first decision diamond is denoted 340 and the program determines whether the failure is a level 1 failure. If it is not, the program proceeds to decision diamond 342 to ascertain whether it is a level 2 failure, and if that is also negative, the program proceeds to decision diamond 344. In decision diamond 344, the program decides whether it is a level 3 failure, and if that is negative, the program branches through connector 1 to process box 310.

Should the program decide in any of the decision diamonds 340, 342, or 344 that the failure has occurred at that particular level, the program branches through connectors 2, 3 or 4, respectively. Connector 2 branches the program to process box 346 where the program causes the appropriate program warning to be displayed on display 18 (FIG. 1). From process box 346, the program returns through connector 1 to process box 310. Should the program determine that there is level 2 failure, the program branches to process box 348 where a warm restart is forced and program proceeds through process box 350 where the appropriate warning is indicated on display 18 to connector 1. Should the program decide that it is a level 3 failure, the program branches through connector 4 to process box 352 and forces a cold restart. From process box 352, the program proceeds through process box 354 where the appropriate indication is given on display 18 to connector 1. A cold restart and a warm restart are described in greater detail with respect to FIG. 4A and B.

The program enters the Record Program routine 400 through the associated terminal. Upon entry of terminal 400, the program immediately asks in a decision diamond 402 whether this is a cold restart. A cold restart occurs every time the power is initially turned on. Once the cold restart has been performed, a flag is set and another cold restart will not occur unless forced based on a level 3 failure or upon the cycling of the power on-off switch 28 (FIG. 1).

If the program decides that it is a cold restart, it branches to process box 404 where the program initializes the clock queue, initializes the process list, and initializes the mag tape device, the keyboard and display devices, and the internal clock. Following completion of the initialization phase, the program enters the record menu subroutine and sequentially performs the operations in process boxes 406, 408, 410, 412, 414, 416, 418, and 420. Following accomplishment of the processes in process box 420, the program branches through connector 7 to the working mode subroutines, described in greater detail hereinbelow.

The eight process boxes that comprise the record menu subroutine will also be described with reference to FIG. 11. In process box 406, the program provides for optional loading of the system parameters stored on magnetic tape and read by the data recorder 88 (FIG. 2). Upon initial power up, the display 18 first displays the statement "GEOS RECORD xxx, UNIT NO. nnn," where "xxx" denotes the version number of the record program, and "nnn" denotes the hardwired serial numbers of system 10. Then, the program causes display 18 to read the message "PLEASE LOAD DATA TAPE." Once the data tape is loaded, the system determines whether the parameters have been loaded from the mag tape and if not, proceeds through process box 408 where the data tape can be optionally rewound. From process box 408, the program enters the default section of the record menu subroutine and in process box 410, the program changes the environmental parameters to identify the particular experiment number, the location number, the event sequence, and the year. The system defaults to experiment No. 1, location No. 1, event No. 0 and 1983 as the current year, as depicted in process box 1106. The particular message which appears on display 18 is indicated, including the underlined default decision. The enter key, key De of keyboard 16 (FIG. 1) can be pressed to enter the default response. Thus, as depicted in process box 1102, the tape will be rewound at that point in the program if either the enter key, key De or the yes key, key Dd, is depressed. If key Dc, the NO key, is depressed, the tape will not be rewound and the message "CHANGE ID PARAMETERS? NO." is displayed. Any desired environment parameters could be utilized with appropriate changes being made to the software.

The program then enters process box 412 and the message "CHANGE SENSOR PARAMETERS? NO." is displayed on display 18 as indicated in process box 1108. If the default answer "NO" is not selected, then the program proceeds to ask for each analog channel selection the desired sensor type, the amplifier gain, the antialiasing for each channel, and the aggregate sampling rate. With reference to process box 1110, and as described above, it is seen that six active analog channels are provided for with the default selection being for the force balance accelerometers for channels 1 through 3 and the velocity transducer for channels 4 through 6. In addition, the operator can select and indicate which channels are active, the channels having to be sequentially designated. As also seen from process box 1110, the default parameters for the amplifier gain for the forced balance accelerometers is 0 dB and for the velocity transducer is 24 dB, and the range of settings is from 0-60 dB in 6 dB intervals. In every case, the default for the antialiasing filters is 50 Hz with the other choices being 0, 17, 33 and 100 Hz. The default for the sample rate is depicted in process box 1112 as being 1200 samples per second with a range of 0.03-1200 samples per second.

From process box 412, the program proceeds to process box 414 where the prompt "CHANGE RECORDING MODE? NO". If answered yes, the prompts "SELECT RECORDING MODE . . . MODE: TRIGGER-1; PRESET-2; BOTH-3; 1" are displayed. The 1, 2 or 3 key is then pressed followed by the "Enter key". The trigger parameters relate to the automatic recording mode and how often each sensor will be sampled and the sample stored in data memory 58. In the trigger mode a determination is automatically made by the program using a trigger algorithm (discussed below) based on the operator selected trigger parameters. The available trigger parameters include the trigger channel selection, the short term average (STA) selection, the long term average (LTA) selection, the trigger level ratio selection, and the post-trigger recording time selection. The preset event parameters or mode parameters are divided between a basic mode or a periodic mode. In the basic mode, the operator selects the event time and the event duration, whereas in the periodic mode, the operator selects the first event time, the delta event time, the number of events, and the event recording duration. The prompts and the defaults are indicated in process boxes 1114, 1116, 1118, 1120, 1122, and 1124.

Next the program proceeds to process box 416 where the clock parameters can be changed. The prompt that is displayed is depicted in process box 1126. These parameters include allowing the initial clock to be synchronized to radio station WWVB, to a master clock (MST), manually (MAN) or no sync (NO). In addition, an option is provided to enable automatic periodic synchronization at future intervals and to check time differences between the internal clock and with external signals from radio station WWVB or with the internal master clock. The prompts indicated on display 18 and the defaults, as well as the number of digits desired for certain open entries are indicated in process boxes 1126 through 1148. The particular synchronization for the internal clock is indicated in process box 1124.

The program then proceeds to process box 418 for the prompts and defaults for the amplifier and sensor calibration. The sensor calibration and amplifier calibration are automatically performed, however an optional 5 hertz square wave amplifier input, a repeated sensor calibration, or a record amplifier and sensor calibration on mag tape can be performed. If amplifier and sensor tests are selected by the operator, the program instructs A/D module 82 to generate a voltage function on a channel 8 for transmission through the amplifiers of signal conditioning module 78 and A/D module 82 for optional recording by data recorder 88. The prompts and defaults are given in process boxes 1150, 1152, 1154, and 1156.

The program finally exits the record menu or remains in the record menu depending upon the response to the prompt generated by the program in process box 420. If no further review of the selected parameters is desired, the program then exits the record menu subroutine through connector 7 and enters the working mode subroutine.

A determination by the program in decision diamond 402 that there is no cold restart causes the program to branch to a decision diamond 422 in which the program decides whether there is a warm restart. A warm restart occurs after the system has already proceeded through a cold restart and performed the initialization procedures, but has been reset for some reason. The decision is made based on whether the cold restart flag has been reset and the restart flag has been set. In that condition, the program branches from decision diamond 422 to a process box 424 in which the program causes display 18 to read "WARM RESTART; USING SAVED PARAMETERS." From process box 424, the program proceeds into the record menu subroutine and continues as described above.

If there is no warm restart, the program branches from decision diamond 422 to a process box 426. This is the normal path that the program takes during the working mode. Therefore, the program verifies the clock queue entries in process box 426 and then proceeds to process box 428 in which the program verifies the process activity. From this point, the program proceeds to decision diamond 430 in which it determines whether the menu key, key Bd (FIG. 1), has been depressed and the menu active flag has been set. If the menu flag has not been set, then the program branches to process box 424 and then re-enter the record menu subroutine, as described above.

If the program decides in decision diamond 430 that the menu is not active, then the program enters the working mode subroutine. This subroutine begins with a process box 432 in which the program calculates the size of the pre-event memory based on the sample rate. As mentioned above, the sample rate is the frequency at which the analog signals produced by sensors 64 are sampled and converted to digital data. The program also clears the pre-event counter in process box 432 and schedules the first battery check. The pre-event counter is a counter that keeps track of all stored data representative of the output from the signals prior to the determination that a seismic event has occurred. Battery checks are frequently made to determine the life and operability of the storage batteries.

From process box 432, the program enters the analog-to-digital sample start subroutine 434, the first stage of which is process box 436. In process box 436, the program obtains the data RAM 512 word block for digitizing samples and stores it in the working part of the RAM section of program memory 56 (FIG. 2). The program then proceeds to decision diamond 438 where an inquiry is made as to whether it is time to conduct the periodic battery check. If a battery check is due, the program branches to process box 440 where a single digital sample on internal sensor channel 8 is performed. The results of that sample is used later in the battery check subroutine (not shown). If a battery check is not due, the program branches to process box 442 where the DMA sampling on all active channels is commenced to fill the designated data block in data memory 58. The program then proceeds to process box 444 from either process boxes 440 or 442. The program arms the analog-to-digital hardware interrupt in process box 444 in preparation for the hardware interrupt subroutine (described below with respect to FIG. 7). From process box 444, the program leaves subroutine 434 and proceeds to process box 446.

In process box 446, the program turns the power off to display 18 in order to conserve power and then proceeds to process box 448 where the keyboard status interrupt is enabled. This permits an interrupt to be recognized to the microprocessor from the keyboard.

Figure 5:
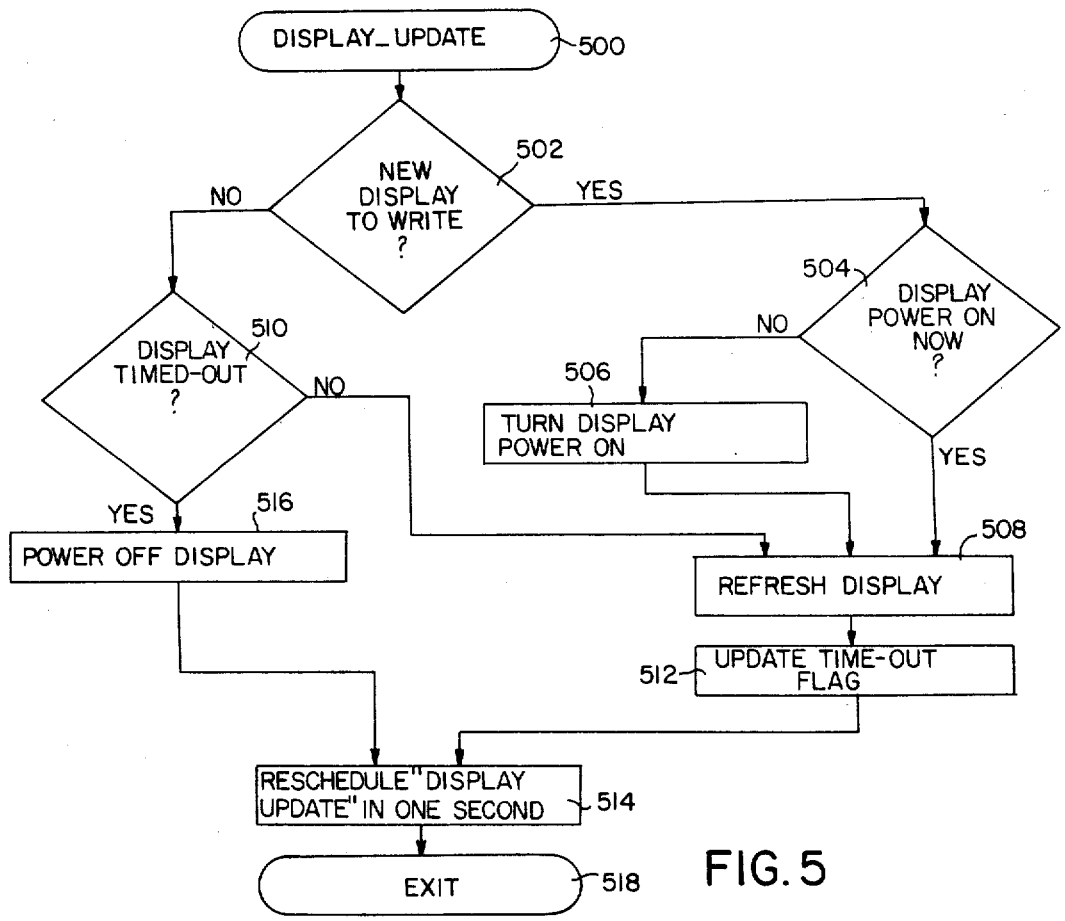
FIG. 5 is a flow chart of a computer program for updating the output display.

From process box 448, the program proceeds to process box 450 where a time is scheduled to do the Display Update Subroutine (see FIG. 5). Then, the program exits the record program entry routine 400 through terminal 452.

With reference now to FIG. 5, the Display-Update Subroutine 500 is depicted. Subroutine 500 is a called subroutine which is performed at specifically scheduled times. The program enters decision diamond 502 and determines whether there is a new display to be written. Displays to be written are stored in a scratch pad memory by other subroutines and routines in the computer program. If a new display is to be written, the program branches to decision diamond 504. In decision diamond 504, the program determines whether the display power is on and if not branches to process box 506 where the display power is turned on. If the display power has been determined to be on or after it has been turned on in process box 506, the program proceeds to process box 508 where the display is refreshed from the display scratch pad memory area.

If the program determines in decision diamond 502 that a new display is not to be written, the program then branches to decision diamond 510 where a determination is made as to whether the display has timed out. If the display has not timed out, the program branches to process box 508 where the display is refreshed, as mentioned above. From process box 508, the program proceeds to process box 512 where the time-out flag is updated and then proceeds to process box 514 where a further display update is rescheduled. The time-out flag set in process box 512 is used in decision diamond 510 to determine if the display has timed out. This procedure is used to minimize the power consumed by the system and thus preserve the battery. It is essentially a safety feature which ensures that the display will automatically be de-energized if it is left on for too long a period of time. From decision diamond 510, assuming that the display has timed out, the program proceeds to process box 516 where the display power is turned off. The program then proceeds to process box 514 as mentioned above, from which the program exits the subroutine 500 through terminal 518.

Figure 6:
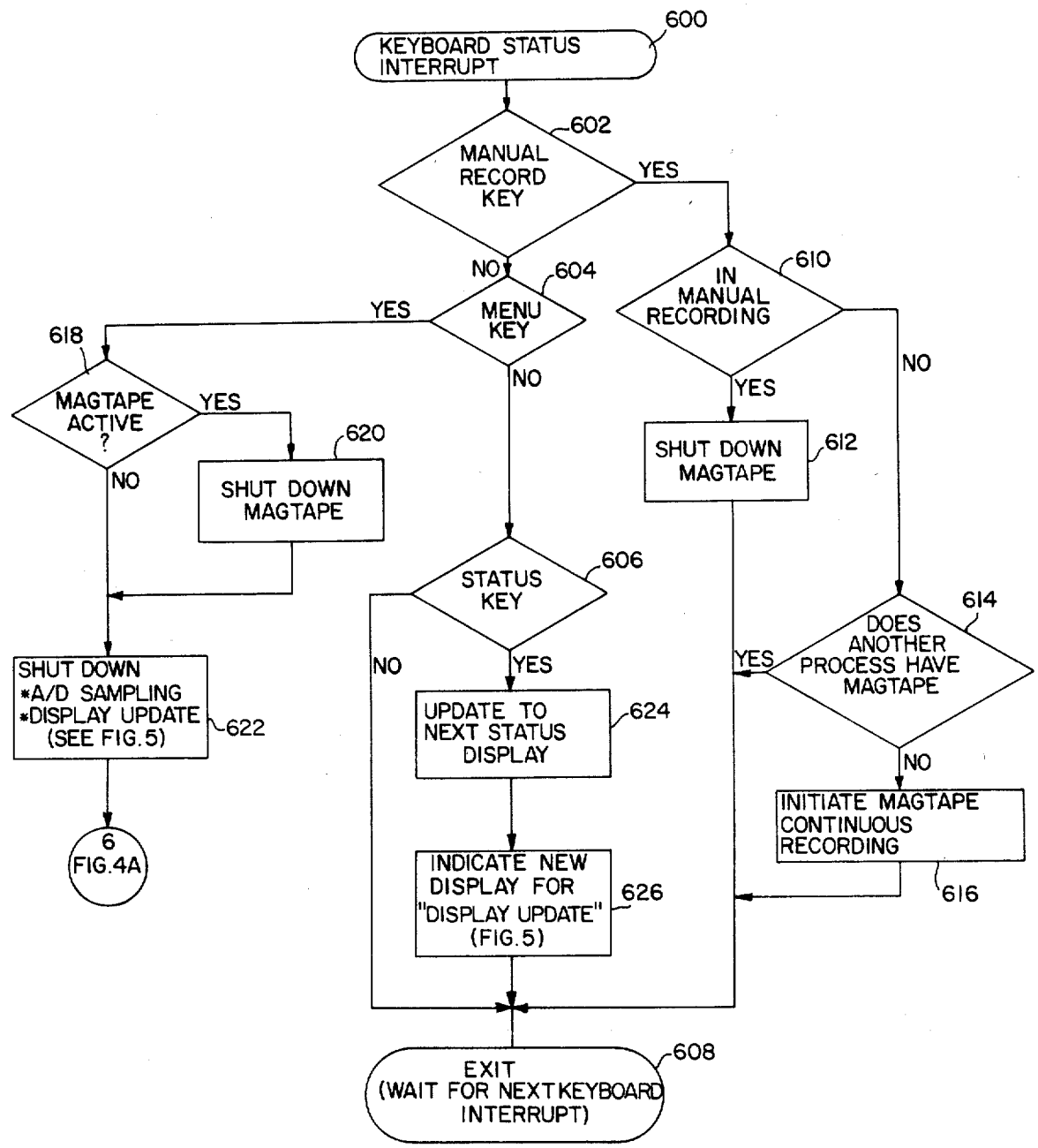
FIG. 6 is a flow chart of a computer program for the input keyboard interupt routine.

The keyboard status interrupt subroutine is depicted in FIG. 6. This subroutine is automatically called upon an interrupt generated by depressing a key on keyboard 16 (FIG. 1). The subroutine enters through terminal 600 and immediately proceeds to a plurality of serially connected decision diamonds 602, 604 and 606. These decision diamonds determine, respectively, whether the manual record key, the menu key, or the status key has been depressed. If none of these three keys have been depressed, the program proceeds to exit terminal 608 and the program waits until the next keyboard interrupt has been received.

If the program determines in decision diamond 602 that the manual record key has been depressed, the program branches to decision diamond 610 where the program determines whether the system is already in the manual recording state. If the system is in the manual recording state, then the program branches to process box 612 where the mag tape is turned off and then the program exits through terminal 608. In this way, the same key, MAN. REC. key Be of keyboard 16 can be used to place recorder 88 in or take it out of the manual recording mode. In the manual recording mode, recorder 88 is taken out of software control and continuously records. If the program decides in decision diamond 610 that recorder 88 is not in the manual recording mode, the program branches to decision diamond 614 wherein it determines whether another process is currently utilizing recorder 88. If the program decides that there is another process in operation using recorder 88, then the program again branches to exit terminal 608. On the other hand, if recorder 88 is not being used, the program branches to process box 616. In process box 616, the program initiates continuous recording of recorder 88. Once recorder 88 is turned on, the program proceeds to exit terminal 608.

If the program determines in decision diamond 604 that it is the menu key that has been depressed, the program branches to decision diamond 618 wherein the program determines whether recorder 88 is in use. If recorder 88 is in use, the program branches to process box 620 where the recorder is shut down. From process box 620, or from decision diamond 618 should recorder 88 be found not to be in use, the program proceeds to process box 622. In process box 622, the program shuts down any sampling currently in progress and calls subroutine 500 to update display 18 (see FIG. 5). From process box 622, the program branches through connector 6 to the record menu subroutine depicted in FIG. 4 and discussed above.

Finally, if the program determines that it was the status key Ad of keyboard 16 (FIG. 1) that was depressed, the program proceeds to process box 624. The status key permits the operator to determine the system setup. The program in process box 624 loads a scratch pad memory with the status information to be serially displayed by display 18. This information includes the present internal time and the method of synchronizing the internal clock, then the number of events which have been recorded, the percentage of tape that has been used, the elapsed time that the system is on, and the present battery voltage. From process box 624, the program proceeds to process box 626 where this information is displayed by the display update subroutine 500. From process box 626, the program exits through terminal 608.

Figure 4A:
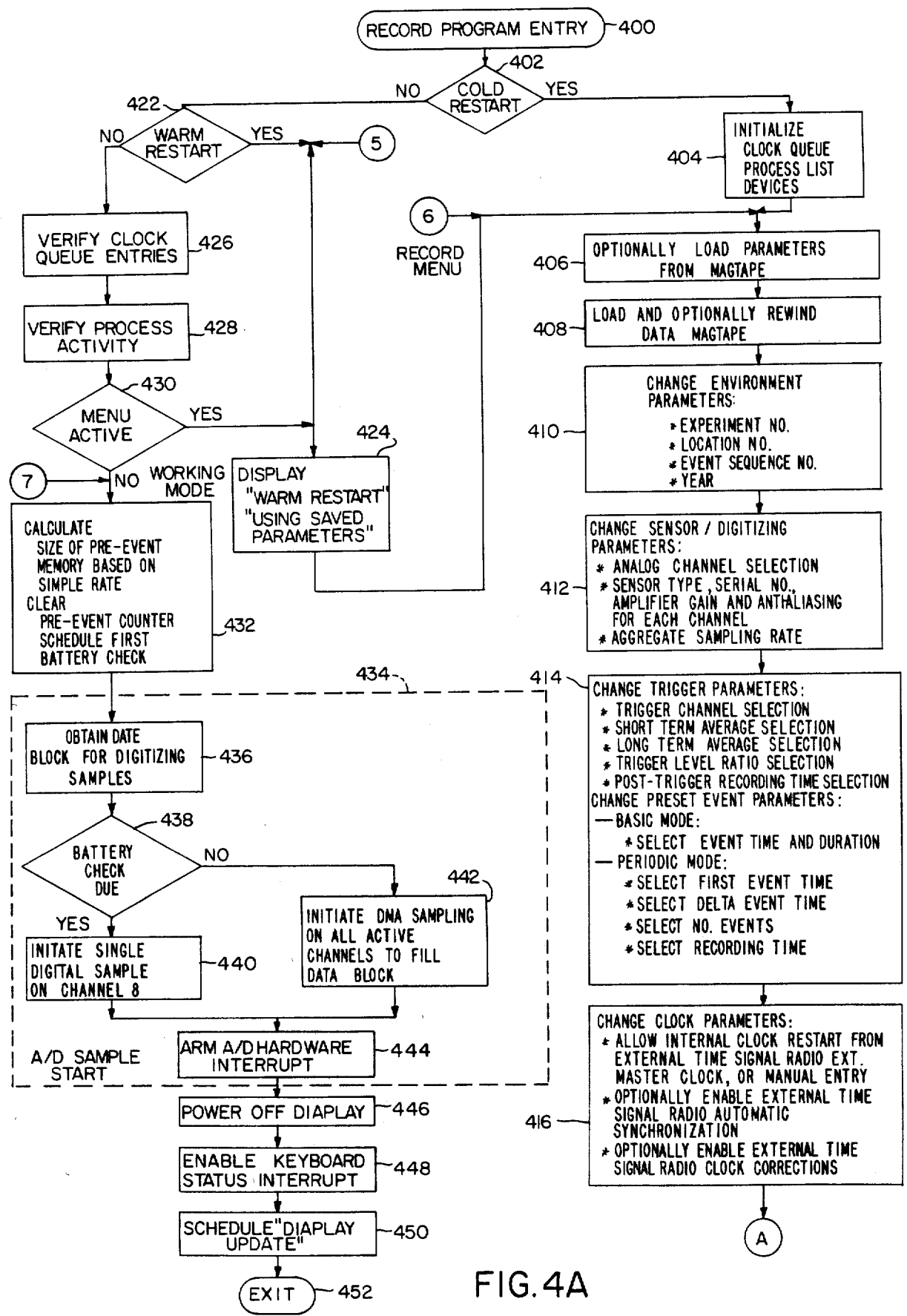
FIGS. 4A and 4B are flow charts of a computer program for performing program control of the various hardware modules.
Figure 4B:
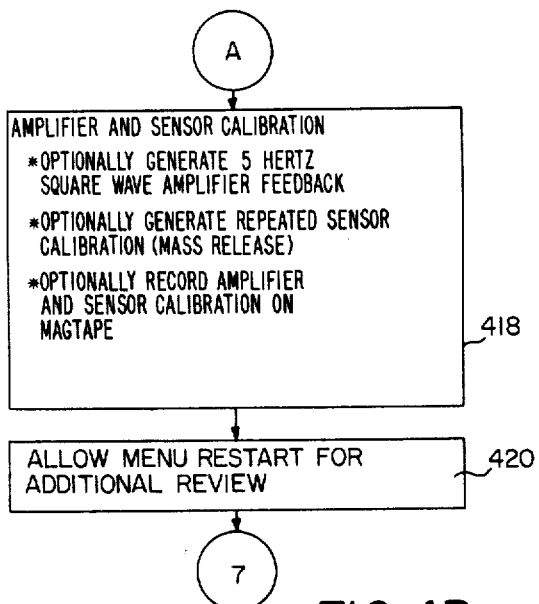
Figure 7:
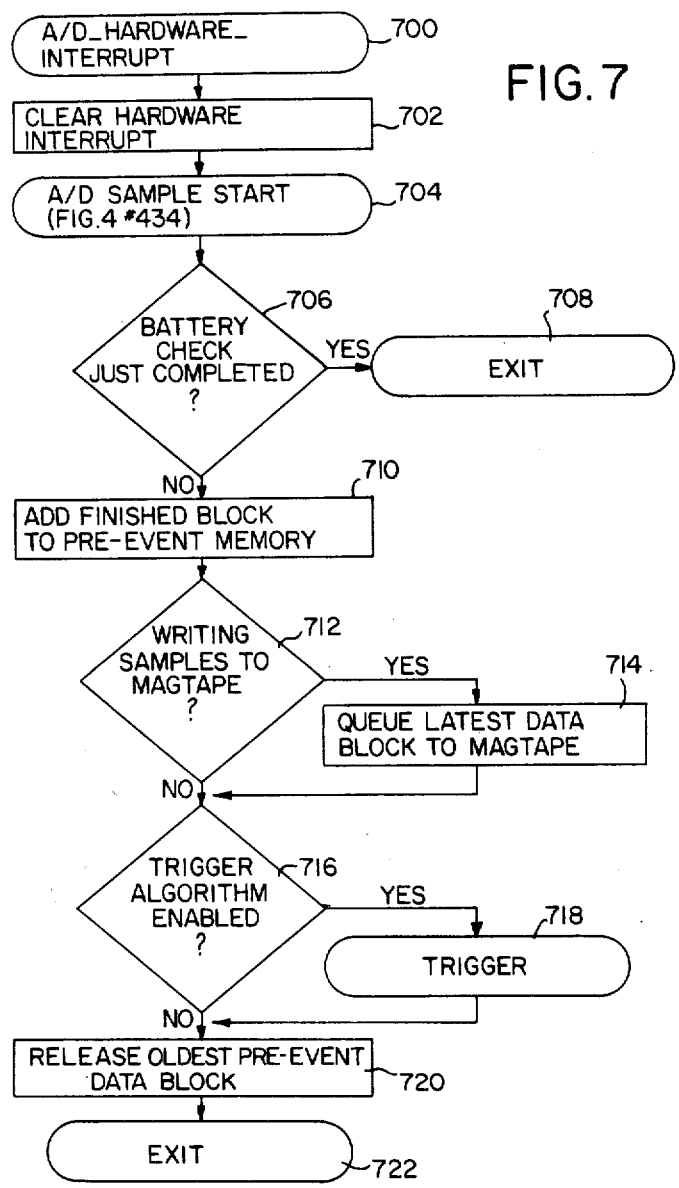
FIG. 7 is a flow chart of a computer program for performing a routine associated with the analog-to-digital converter hardware module.

The analog-to-digital hardware interrupt subroutine 700 is depicted in FIG. 7. The subroutine is called by a hardware interrupt and proceeds to process box 702 where the interrupt is cleared. From there the program calls the A/D sample start subroutine 434 (FIG. 4). When subroutine 434 has been performed, the program proceeds to decision diamond 706 to determine whether a battery check has been completed. If the battery check has been completed, the program exits through terminal 708. If the battery check has not been completed, the finished block is added to the pre-event memory in process box 710. A determination is then made as to whether the converted data should be stored on recorder 88.

The determination as to whether the sample is to be stored by recorder 88 is made in decision diamond 712. If the answer is yes, the program branches to process box 714 where the latest data block is queued to recorder 88. If the decision in decision diamond 712 is no or following process box 714, the program branches to decision diamond 716 where it is determined if the trigger algorithm is enabled. The trigger algorithm is an algorithm that can be set up for each individual area taking into consideration the background seismic activity. Essentially, the algorithm determines based on the magnitude and frequency, the STA and LTA intervals and the post trigger recording time of the stored, converted sensor data whether an event has occurred and whether the data should be recorded on tape recorder 88. If the algorithm has been enabled, the program branches to terminal 718 which calls the trigger subroutine. In the trigger subroutine, the event data temporarily stored in pre-event data memory 58 is scanned by the microprocessor and a determination is made by it if the data is a seismic signal that should be recorded. If it should be recorded, the data is transmitted in Direct Memory Access mode through data bus 59 to the data recorder module 88. Upon completion of the trigger subroutine, the program returns to hardware interrupt subroutine 700 and the program proceeds to process box 720. The program also proceeds to process box 720 if the trigger algorithm is not enabled as determined in decision diamond 716. In process box 720, the program releases the oldest pre-event data block so that this data block can be recorded over with new information. The program then exits the subroutine in terminal 722.

In summary, the system operation is as follows. In the operation mode, analog signals from a selectable number of sensors 64 are amplified and filtered to prevent aliasing in signal conditioning module 78 and are multiplexed, sampled, temporarily held and converted to digital signals in analog-to-digital conversion module 82. The microcomputer 52 control of the various modules permits amplifier and filter settings as well as digitization rates to be set under software control. Temporary storage of the converted digital data is provided in data memory 58. If the trigger option is selected, the microcomputer 52 periodically samples the stored data in data memory 58 and decides whether the data should be permanently recorded. If the data is to be permanently recorded, a DMA operation is performed and the data is transferred from data memory 58 through a separate data bus 59 to and recorded on data recorder 88. Alternatively, the data can be transferred to an external mass storage device as well as to desired preprocessing prior to recording. The DMA operation can also be performed at predetermined time intervals or can be manually controlled by an operator. The system configuration permits augmentation of the microprocessor with an external computer through data memory 58. In addition, microcomputer control of time control module 72 permits the updating of the internal time standard at selected intervals with the reference time being recorded as desired. The internal time standard is preferably calibrated to the standard time signal broadcasted over radio station WWVB. A digital-to-analog conversion module 96 permits a read capability of the stored data, stored either in data memory 58 or on data recorder 88, and a conversion to an analog form for display on an appropriate instrument.

The system software permits interactive, English language commands to prompt an operator for proper instrument setup using a 32 character alphanumeric display 18. Appropriate default parameters stored in the EPROM section of program memory 56 permit an automatic system setup in the field with little operator interaction.

Figure 8:
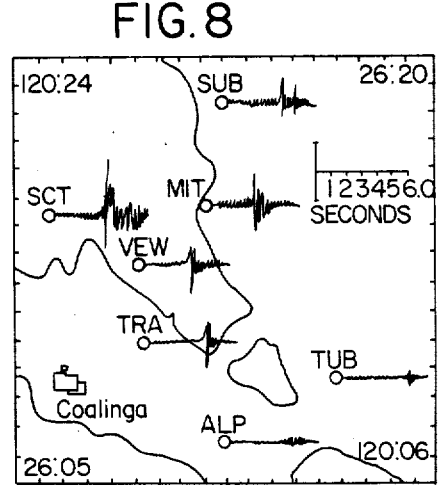
FIG. 8 is a map with superimposed representations of the north-south components of acceleration signals recorded at various locations.
Figure 9:
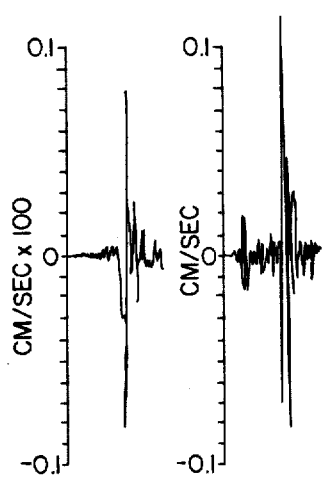
FIG. 9 is a graph of the east-west components of velocity of two different signals.
Figure 10:
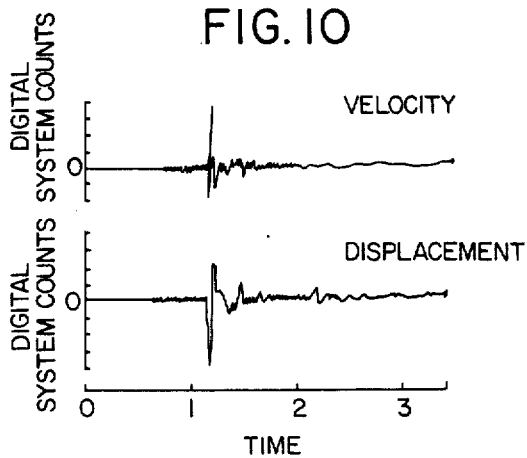
FIG. 10 is a graph of a recorded velocity and inferred displacement of signals from two small aftershocks.

An embodiment of the present invention has been utilized to record near-source strong motion data, micro earthquakes, seismic-refraction data, seismic data from down-hole arrays, and teleseismic data. Examples of the data which illustrates the dynamic range and signal resolution is depicted in FIGS. 8, 9, and 10. The data illustrated in FIGS. 8 and 9 were collected near Coalinga, California. In FIG. 8, the recordings are of the north-south component of ground motion as detected on forced balance accelerometers for a magnitude 5.1 after shock. A simultaneous recording of a velocity transducer at station SUB (FIG. 8) for the east-west component of motion is depicted as the left trace in FIG. 9. A recording obtained from the same sensor of a much smaller event (M 1.0) is plotted on the right side of FIG. 9, however using an amplitude scale expanded by a factor of 100.

FIG. 10 depicts an example of a sample collected in New Brunswick, Canada. In this eastern North American site, the attenuation of high frequency signals is much less than that found in the Western United States. The upper, velocity trace in FIG. 10 shows the horizontal component of motion recorded from a velocity transducer at 1200 samples per second with no low cut filtering for a small event (M less than 1.0) at a distance of about 4 km. The lower trace in FIG. 10 corresponds to the derived displacement time history. The base line before intregration was removed by calculating the geometric mean of the first 512 samples in the timed series. The natural frequency of two Hz for the velocity transducer which generated the signal recorded in the upper trace of FIG. 10 contributes to the spectral fall off for frequencies less than 2 Hz. The spectrum illustrates an extremely broad dynamic range for the recorded signals (i.e., greater than 90 dB) and indicates frequency content of the recorded seismic signal as high as 150 to 200 Hz. Increments of 6 dB relative signal strengths are indicated.

The present invention has been described hereinabove with respect to a specific embodiment thereof. It can be seen that the present invention in the particularly disclosed embodiment provides a seismic data acquisition system that is completely portable, can fit under an airplane seat and thus is convenient for applications requiring rapid deployment, and also can be used in a permanent observatory. The system, when equipped with forced balance accelerometers and velocity transducers can record seismic signals ranging from the seismic background noise to M 8+ events on scale without any changes in the instrument settings. Linear and a wide dynamic range of up to 96 dB are achieved by using a 16 bit analog-to-digital converter with the capability of achieving even a greater gain range of up to 120 dB. Broad and variable band width is achieved with high digital throughput rates of 1200 samples per second achievable by using Direct Memory Access. Computer compatibility and large data capacity are achieved by using a tape-cartridge recorder which writes or reads ANSI standard format in serpentine fashion. Tape lengths up to 450 feet with up to 6400 bpi permit data storage of greater than 1.88 M, 16 bit samples with the provision that additional slave recorders can be added. The maximum ease in transferring data is obtained through either tape or an RS-232 interface. Recording parameters and system software can be changed automatically and a 32 character LED alphanumeric display with English language commands permits easy operator interaction with minimum field operation errors and flexible field set-up. The use of an extensive set of default parameters also permits rapid set-up in the field by personnel having minimal special training. The low power consumption is provided by using CMOS components and power switching circuitry under software control. Consequently, deployment of the system for up to three days on internal batteries can be achieved and extended times on external batteries. Internal time standard accuracy is provided by a provision for automatic synchronization with an external time signal provided by radio station WWVB.

While the present invention has been described with respect to a specific embodiment, other modifications and variations would be obvious to those skilled in the art.

| APPENDIX 1 MICROCOMPUTER BUS PINOUTS | | | |
|---|---|---|---|
| 1–2 | Logic Ground | 51–52 | Spare |
| 3–4 | 1 MHz clock input | 53–54 | −12 VDC |
| 5 | Spare | 55–56 | Spare |
| 6 | Spare | 57–58 | AGND |
| 7 | Spare | 59–61 | EMA 2, 1, and 0 |
| 8 | Spare | 62 | ROM PWR CONTL |
| 9–20 | ADR 0-11 | 63 | LINK |
| 21–36 | MEM 0-15 | 64 | RUN/HLT |
| 37 | XTC 65 | | RUN |
| 38 | DMAMEMSEL* | 66 | CPSEL* |
| 39 | DMALXMA | 67 | UP* |
| 40 | SPARE | 68 | SWSEL* |
| 41 | Spare | 69 | DMAEN |
| 42 | Spare | 70 | CPREQ* |
| 43 | Spare | 71 | MSEL* |
| 44 | Spare | 72 | DATA F |
| 45 | +5 VDC | 73 | INTGNT |

| -continued APPENDIX 1 MICROCOMPUTER BUS PINOUTS | | | |
|---|---|---|---|
| 46 | +5 VDC | 74 | CPU RESET* |
| 47 | Spare | 75–77 | C2*, C1*, C0* |
| 48 | Spare | 78 | DEVSEL* |
| 49 | +12 VDC | 79 | WAIT* |
| 50 | +12 VDC | 80 | LXMAR |
| | | 81–83 | XTB, XTC*, XTA |
| | | 84 | SKP/INTX |
| | | 85 | DMAGNT |
| | | 86 | DMAREQ* |
| | | 87–98 | DX0-DX11 |
| | | 99–100 | Logic Gnd |

APPENDIX 2
SYSTEM SPECIFICATIONS

Sensor Inputs

Input Channels: 6 balanced differential inputs
Input Impedance: 940 Kohms differential, 470 Kohms to ground. May be shunted for lower impedence.
Input voltage for full scale output: ±10 mV to ±10 V programmable in 6 dB steps, 60 dB to 0 dB gain
Preamplifier Dynamic Range: greater than 100 dB at 0 dB gain.
System noise: less than 3 microvolts peak to peak in the bandpass .1 Mz to 50 Mz, less than 5 microvolts peak to peak .1 Mz to 500 Mz.
Option: noise can be reduced to 1 microvolt peak to peak .1 Mz to 50 Mz with low noise Op Amps, power will be increased by 70 mW per channel.
Filters: low pass Butterworth, 42 dB per octave: 17 Hz, 33 Hz, 50 Hz, and 100 Hz. High pass .1 Hz 6dB per octave.
Calibration: Internal, Automatic with or without sensor calibration.
Transient protection: Inputs protected with transient protectors at ±15 V.
Input Connectors: Waterproof, multipin, 3 channel each.

A/D Converter and Multiplexer

Resolution: 16 bits (1 part in 65,536)
Stability and Linearity: ±1 count-no missing codes over full temperature range of −20° C. to +60° C.
Conversion Rate (Total samples per second for all active channels): 1200 samples per second maximum, .29 samples per second minimum. Programmable as 1,200/N where N is 1 through 4,096.
Crossfeed Isolation: Greater than 100 dB Data Memory Size: 4,096 words, 16 bits per word.
Access: Data is read into the memory via a cycle steal DMA from the A/D converter. Data is written from the memory via a simultaneous DMA to the magnetic tape formatter.
Pre-trigger memory: Five, 512 word blocks minimum at 1,200 samples per second (2.14 seconds). Six 512 word blocks at 300 samples per second (10.24 seconds).

Program Memory

Executable Memory: 8K 12 Bit word CMOS RAM.
Program Storage: 16K 12 Bit word CMOS PROM.
Alternate Program Storage: Programs may be stored on magnetic tape for loading directly into program RAM.

Recording Modes

Self triggering:
Near Field: Short term average (STA), long term average (LTA) Ratio.
Teleseismic: Comparative ratios for two selected frequency bands.
Pre-Set time: will record at selectable times and intervals.
Both: Will operate in both pre-set time and self triggering modes.
Manual: Will record under keyboard control for start-stop functions.

Recording Media

Cartridge: 3M type DC 300 with up to 450 ft of digital tape
Recording Density: 1600 bpi
Number of tracks: 4, recorded serpentine fashion, records on one track at a time.
Record block length: 512 words (5.12 in.), Inter record

APPENDIX 2
SYSTEM SPECIFICATIONS gap; 0.75 in.
Tape capacity: 3,680 512 word blocks (1.88 million samples) typical for 450 ft. tape. Twenty six minutes continuous record time at the maximum sample rate.
Tape Speed: 30 ips write or read.

Display and Keyboard

Display Type: LED with optical filters 32 characters, alphanumeric, 18 segment, character height .15 in.
Keyboard Type: Mechanical switch with dust cover and water seal. 20 button keyboard with numerical and function entry.

Status

Time, battery voltage, no. of events, % of tape used, up time (elapsed time since power on).

Internal Timebase

Frequency: 3 MH$_Z$
Temperature Stability: $\pm 1 \times 10^{-6}$; $-20°$ C. to $+70°$ C.
Aging Rate: less than $5 \times 10^{-7}$ per year Communications Interface I/0 Port: RS-232 Compatible, baud rate programmable to standard rates Time Synchronization WWVB Receiver: Internal receiver designed to be used with active, ferrite antenna. Will automatically synchronize internal clock to WWVB under program command.
External time: Will start internal clock with external pulse and will compare and note time difference between external time tick and internal clock after startup.
Manual Start: Time can be entered through keyboard and started by key manually.

Power Requirements

Voltage, current: +24 VDC nominal $\pm 15\%$, 40 mA nominal in operating mode with display off. 300 mA nominal with display on, 600 mA with display on and recording.
Internal batteries: $\pm 24$ V, 5 AH Gates type, operates about 3 days on internal batteries. Connector provided for internal battery charging or external battery operation.

Physical and Environmental Requirements

Case Type: Waterproof aluminum case, 20½" long, 9⅞' wide 13¾" high
Weight: 47 lbs. with internal batteries.
Operating Temperature Range: $-20°$ C. to $+60°$ C., 15% to 95% rel. humidity

We claim:

1. A computer system for monitoring analog signals produced by a plurality of transducers, the system comprising:
   a computer bus;
   a microcomputer comprised of a microprocessor and program memory connected to said computer bus, said program memory for storing software that controls operation of said microprocessor, which programmed microprocessor in turn controls the operation of said system;
   a plurality of software selectable input channels connectable to the transducers, each channel comprising amplifiers and software selectable filters;
   an analog to digital converter coupled to a selected input channel for converting analog data from said selected input channel to digital data;
   a Direct Memory Access data bus;
   Direct Memory Access data memory connected to said data bus;
   a controller for initiating a Direct Memory Access data transfer of said digital data from said converter to said data memory through said data bus;
   a data recorder connected to said data bus; and
   means for automatically storing said digital data on said data recorder.

2. The system as claimed in claim 1, and further comprising a signal conditioning means for conditioning an analog signal received from a sensor and for providing the conditioned signal to said converter.

3. The system as claimed in claim 2 wherein said conditioning means includes filtering means and means under control of said programmed microprocessor for changing the filtering of said filtering means.

4. The system as claimed in claim 1 and further including portable battery means for providing all of the power to said system.

5. The system as claimed in claim 4 and further including means under control of said programmed microprocessor for automatically controlling the power supplied to preselected components of said system.

6. The system as claimed in claim 1 and further including a portable housing in which said system is contained, and a front panel mounted on said housing for permitting operator control of said system.

7. The system as claimed in claim 6 wherein said front panel includes a keyboard having numeric keys, cursor control keys and function keys, and an alphanumeric display.

8. The system as claimed in claim 7 and further including means under control of said programmed microprocessor for automatically controlling the power supplied to said display such that said power is turned off when said display is not being used.

9. The system as claimed in claim 1 and further including means under control of said programmed microprocessor for automatically scanning preselected ones of said input channels.

10. The system as claimed in claim 9 wherein said scanning means includes a control means for controlling the operation of said controller.

11. The system as claimed in claim 1 and further including an internal clock means for keeping track of the absolute time; and
    means under control of said programmed microprocessor for calibrating said internal clock means.

12. The system as claimed in claim 11 wherein said clock calibrating means includes means for receiving an external time standard broadcast by a radio station and means for calibrating said internal clock means with said external time standard.

13. The system as claimed in claim 12 wherein said clock calibrating means further includes means under control of said programmed microprocessor for automatically calibrating said internal clock means at predetermined, future times.

14. The system as claimed in claim 1 and further including a digital to analog converter means for providing an analog output signal of selectable, stored digital data.

15. The system as claimed in claim 1 wherein said controller under command of said programmed microprocessor causes new converted data to be stored cyclically in said data memory such that new data overwrites the oldest stored data.

* * * * *